(12) United States Patent
Takai et al.

(10) Patent No.: US 10,416,354 B2
(45) Date of Patent: Sep. 17, 2019

(54) TRANSLUCENT STRUCTURE

(71) Applicant: AGC Inc., Chiyoda-ku (JP)

(72) Inventors: Azusa Takai, Chiyoda-ku (JP); Toru Ikeda, Chiyoda-ku (JP); Satoshi Kashiwabara, Chiyoda-ku (JP); Yosuke Takeda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 166 days.

(21) Appl. No.: 15/418,982

(22) Filed: Jan. 30, 2017

(65) Prior Publication Data
US 2017/0139082 A1 May 18, 2017

Related U.S. Application Data

(63) Continuation of application No. PCT/JP2015/071991, filed on Aug. 3, 2015.

(30) Foreign Application Priority Data

Aug. 4, 2014 (JP) ................. 2014-158548

(51) Int. Cl.
*G02B 1/113* (2015.01)
*B32B 7/02* (2019.01)
*G02B 5/02* (2006.01)

(52) U.S. Cl.
CPC ............. *G02B 1/113* (2013.01); *B32B 7/02* (2013.01); *G02B 5/0221* (2013.01);
(Continued)

(58) Field of Classification Search
CPC .. G02B 1/113; G02B 1/00; G02B 1/11; G02B 27/0018; G02B 5/0278;
(Continued)

(56) References Cited

U.S. PATENT DOCUMENTS

2007/0195419 A1 8/2007 Tsuda et al.
2007/0217014 A1* 9/2007 Fukushige .............. G02B 1/111
359/582
(Continued)

FOREIGN PATENT DOCUMENTS

JP  2008-107756  5/2008
JP  2008-209867  9/2008
(Continued)

OTHER PUBLICATIONS

English translation of JP 2009061686, machine translated on Nov. 7, 2018.*

(Continued)

*Primary Examiner* — Jie Lei
(74) *Attorney, Agent, or Firm* — Oblon, McClelland, Maier & Neustadt, L.L.P.

(57) ABSTRACT

The translucent structure of the present invention has a haze of higher than 10% and at most 70% and has a concavo-convex structure on its surface. The concavo-convex structure has first convex portions having a diameter of larger than 10 μm in a cross section at a height of 0.05 μm+the bearing height of a surface shape, and second convex portions having a diameter of larger than 1 μm in a cross section at a height of 0.5 μm+the bearing height. The average diameter of the first convex portions is larger than 10 μm and at most 185 μm in a cross section at a height of 0.05 μm+the bearing height. The maximum height of the first convex portions is from 0.2 to 8 μm. The number of the second convex portions is from 0.0004 to 1.2 per 1 um².

20 Claims, 9 Drawing Sheets

(52) U.S. Cl.
CPC ......... *G02B 5/0231* (2013.01); *G02B 5/0268*
(2013.01); *G02B 5/0278* (2013.01)

(58) Field of Classification Search
CPC .. G02B 5/0268; G02B 5/0221; G02B 5/0231;
B32B 7/02; C08F 2/50
USPC ............... 359/601, 603, 609, 613, 586, 599;
427/163.4, 162; 349/112, 137
See application file for complete search history.

(56) References Cited

U.S. PATENT DOCUMENTS

| | | |
|---|---|---|
| 2013/0271836 A1 | 10/2013 | Fukaya et al. |
| 2015/0293272 A1 | 10/2015 | Pham et al. |

FOREIGN PATENT DOCUMENTS

| | | |
|---|---|---|
| JP | 2009-58640 | 3/2009 |
| JP | 2009-61686 | 3/2009 |
| JP | 2009-66757 | 4/2009 |
| JP | 2013-156523 | 8/2013 |
| JP | 2013-210567 | 10/2013 |
| JP | 2013-214059 | 10/2013 |
| WO | WO 2014/081693 A1 | 5/2014 |

OTHER PUBLICATIONS

International Search Report dated Nov. 2, 2015 in PCT/JP2015/071991 filed on Aug. 3, 2015.

\* cited by examiner

TRANSLUCENT STRUCTURE

This application is a continuation of PCT Application No. PCT/JP2015/071991, filed on Aug. 3, 2015, which is based upon and claims the benefit of priority from Japanese Patent Application No. No. 2014-158548 filed on Aug. 4, 2014. The contents of those applications are incorporated herein by reference in their entireties.

TECHNICAL FIELD

The present invention relates to a translucent structure and an article.

BACKGROUND ART

With respect to an image display device (for example, a liquid crystal display, an organic EL display or a plasma display) attached to various equipment (for example, a television, a personal computer, a smart phone, a mobile phone or a vehicle), if outside light such as indoor lighting (such as fluorescent light) or sunlight is reflected in a display surface, visibility will decrease due to the reflected image.

As a method to suppress reflection of outside light, a method of disposing an antiglare film having irregularities on its surface, on the display surface of an image display device to diffusely reflect the outside light thereby to blur the reflected image may be mentioned.

As a method of forming an antiglare film, a method of applying a coating liquid containing a silica precursor such as a hydrolytic condensate of an alkoxysilane to a substrate by a spay method, followed by baking has been known (for example, Patent Document 1). In the case of forming an antiglare film by a spray method, a two-fluid spray nozzle is used in many cases.

By disposing an antiglare film to the display surface of an image display device, it is possible to suppress a decrease in the image visibility by reflection of the outside light in the display surface. However, at the same time, sparkle may occur on the surface of the antiglare film, whereby the image visibility decreases. Such sparkle tends to be significant as the antiglare property is higher. For example, in a case where an antiglare film is formed by a spray method, if the coating liquid is applied several times, the haze tends to be high and the antiglare property is increased, however, sparkle tends to be significant.

Patent Document 2 discloses to dispose a plurality of convex portions separately on a substrate e.g. for the purpose of suppressing sparkle of the image. Said convex portions are in the shape having at least one edge in a tableland shape or a substantially circular basin shape, having a size of a portion in contact with the substrate being from 50 to 250 μm. However, in Patent Document 2, the haze is at most 10%, and the antiglare property is insufficient.

PRIOR ART DOCUMENTS

Patent Documents

Patent Document 1: JP-A-2009-058640
Patent Document 2: JP-A-2013-214059

DISCLOSURE OF INVENTION

Technical Problem

The object of the present invention is to provide a translucent structure which is excellent in the antiglare property and of which sparkle is sufficiently suppressed, and an article provided with the translucent structure.

Another object of the present invention is to provide a process for producing a translucent structure which is excellent in the antiglare property and of which sparkle is sufficiently suppressed.

Solution to Problem

The present invention provides the following.
(1) A translucent structure having the following concavo-convex structure on its surface:
concavo-convex structure: having first convex portions having a diameter (as calculated as an exact circle) of larger than 10 μm in a cross section at a height of 0.05 μm+the bearing height of a surface shape obtained by measuring a region of (101 μm×135 μm) to (111 μm×148 μm) by a laser microscope, and second convex portions having a diameter (as calculated as an exact circle) of larger than 1 μm in a cross section at a height of 0.5 μm+the above bearing height of the surface shape;
the average diameter (as calculated as an exact circle) of the first convex portions being larger than 10 μm and at most 185 μm in a cross section at a height of 0.05 μm+the above bearing height of the surface shape;
the maximum height of the first convex portions being from 0.2 to 8 μm based on a height at the lowest portion in the above region; and
the number of the second convex portions being from 0.0004 to 1.2 per 1 um$^2$, and the average height of the second convex portions being from 0.1 to 8 μm based on the above bearing height.

That is, a translucent structure having a surface structure having (A) first convex portions and (B) second convex portions, wherein
(A) the first convex portions have a diameter (as calculated as an exact circle) of larger than 10 μm and at most 185 μm in a cross section at a height of 0.05 μm+the bearing height of a surface shape in a measurement region of (101 μm×135 μm) to (111 μm×148 μm) by a laser microscope, and have a maximum height of from 0.2 to 8 μm based on a height at the lowest portion in the above region, and
(B) the second convex portions have a diameter (as calculated as an exact circle) of larger than 1 μm in a cross section at a height of 0.5 μm+the bearing height of the surface shape in the above region, their number is from 0.0004 to 1.2 per 1 μm$^2$ in the above region, and they have an average height of from 0.1 to 8 μm based on the above bearing height.
(2) The translucent structure according to the above (1), which has a translucent substrate having the above concavo-convex structure on its surface.
(3) The translucent structure according to the above (1) or (2), which has a translucent substrate and an antiglare film formed on the translucent substrate, wherein the antiglare film has the above concavo-convex structure on its surface.
(4) The translucent structure according to the above (3), wherein the antiglare film has a refractive index of from 1.40 to 1.46.
(5) The translucent structure according to the above (3) or (4), wherein the antiglare film contains silica as the main component.
(6) The translucent structure according to any one of the above (2) to (5), wherein the translucent substrate is a glass plate.

(7) The translucent structure according to any one of the above (2) to (6), wherein the translucent substrate has a curved surface.
(8) The translucent structure according to any one of the above (1) to (7), which further has a water/oil repellent layer, and wherein the surface of the water/oil repellent layer constitutes the surface having the above concavo-convex structure.
(9) The translucent structure according to any one of the above (1) to (8), which has a haze of higher than 10% and at most 70%.
(10) The translucent structure according to any one of the above (1) to (9), which is for an on-vehicle article.
(11) A process for producing the translucent structure as defined in the above (2), which comprises a step of applying a coating composition to the translucent substrate to form a coating film and baking the coating film to form an antiglare film,
wherein the coating composition contains at least one of a silica precursor (A) and particles (C), and a liquid medium (B), and the liquid medium (B) contains a liquid medium (B1) having a boiling point of at most 150° C. in an amount of at least 86 mass % based on the entire amount of the liquid medium (B), and
wherein application of the coating composition is carried out by electrifying the coating composition and spraying it by an electrostatic coating apparatus equipped with an electrostatic coating gun having a rotary atomizing head.
(12) The process for producing the translucent structure according to the above (11), wherein the viscosity of the coating composition at the application temperature is at most 0.003 Pa·s.
(13) An interior article for a transport vehicle, which comprises the translucent structure as defined in any one of the above (1) to (10).
(14) A translucent structure comprising a translucent substrate and an antiglare film formed on the translucent substrate,
wherein the antiglare film has a concavo-convex structure which has first convex portions having a diameter (as calculated as an exact circle) of larger than 10 μm in a cross section at a height of 0.05 μm+the bearing height of a surface shape obtained by measuring a region of (101 μm×135 μm) to (111 μm×148 μm) by a laser microscope, and second convex portions having a diameter (as calculated as an exact circle) of larger than 1 μm in a cross section at a height of 0.5 μm+the above bearing height of the surface shape;
wherein the average diameter (as calculated as an exact circle) of the first convex portions is larger than 10 μm and at most 143 μm in a cross section at a height of 0.05 μm+the above bearing height of the surface shape;
wherein the maximum height of the first convex portions is from 0.2 to 5 μm based on a height at the lowest portion in the above region; and
wherein the number of the second convex portions is from 0.0004 to 1.2 per 1 um$^2$, and the average height of the second convex portions is from 1 to 8 μm based on the above bearing height.
That is, a translucent structure having a surface structure having (A) first convex portions and (B) second convex portions, wherein
(A) the first convex portions have a diameter (as calculated as an exact circle) of larger than 10 μm and at most 143 μm in a cross section at a height of 0.05 μm+the bearing height of a surface shape in a measurement region of (101 μm×135 μm) to (111 μm×148 μm) by a laser microscope, and have a maximum height of from 0.2 to 5 μm based on a height at the lowest portion in the above region, and
(B) the second convex portions have a diameter (as calculated as an exact circle) of larger than 1 μm in a cross section at a height of 0.5 μm+the above bearing height of the surface shape in the above region, their number is from 0.0004 to 1.2 per 1 μm$^2$ in the above region, and they have an average height of from 0.1 to 8 μm based on the above bearing height.
(15) The translucent structure according to the above (14), wherein the antiglare film has a refractive index of from 1.40 to 1.46.
(16) The translucent structure according to the above (14) or (15), wherein the antiglare film contains silica as the main component.
(17) The translucent structure according to any one of the above (14) to (16), wherein the translucent substrate is a glass plate.
(18) The translucent structure according to any one of the above (14) to (17), wherein the translucent substrate has a curved surface.
(19) The translucent structure according to any one of the above (14) to (18), which further has a water/oil repellent layer, and wherein the surface of the water/oil repellent layer constitutes the surface having the above concavo-convex structure.
(20) The translucent structure according to any one of the above (14) to (19), which has a haze of higher than 10% and at most 70%.
(21) The translucent structure according to any one of the above (14) to (20), which is for an on-vehicle article.
(22) A process for producing the translucent structure as defined in the above (14), which comprises a step of applying a coating composition to the translucent substrate to form a coating film and baking the coating film to form the antiglare film,
wherein the coating composition contains at least one of a silica precursor (A) and particles (C), and a liquid medium (B), and the liquid medium (B) contains a liquid medium (B1) having a boiling point of at most 150° C. in an amount of at least 86 mass % based on the entire amount of the liquid medium (B), and
wherein application of the coating composition is carried out by electrifying the coating composition and spraying it by an electrostatic coating apparatus equipped with an electrostatic coating gun having a rotary atomizing head.
(23) The process for producing the translucent structure according to the above (22), wherein the viscosity of the coating composition at the application temperature is at most 0.003 Pa·s.
(24) An article, which comprises the translucent structure as defined in any one of the above (14) to (21).

Advantageous Effects of Invention

The translucent structure of the present invention is excellent in the antiglare property, and sparkle of it is sufficiently suppressed.
According to the process for producing the translucent structure of the present invention, it is possible to produce a translucent structure which is excellent in the antiglare property and of which sparkle is sufficiently suppressed.
The translucent structure which the article of the present invention has is excellent in the antiglare property, and sparkle of it is sufficiently suppressed.

DESCRIPTION OF EMBODIMENTS

The following definitions of terms are applicable throughout description and claims.

"Translucent" means that an object can transmit visible light.

"The bearing height" is a value of the most dominant height z in a height distribution histogram obtained from xyz data of a surface shape in a region of (101 μm×135 μm) to (111 μm×148 μm) (hereinafter sometimes referred to as "observation region") obtained by measuring the observation region by a laser microscope. The height z of the xyz data is a height based on the lowest point in the observation region (a length of a perpendicular drawn from the position at which the height z is measured toward a plane in parallel with the principal plane of the translucent structure in the observation region, including the lowest point), and the same applies to the following height in a surface shape of which the basis is not particularly defined. The bins of the histogram at the time of calculation of the bearing height were set at 1,000.

"Containing silica as the main component" means that $SiO_2$ is contained in an amount of at least 90 mass %.

"A silica precursor" means a substance which may form a matrix containing silica as the main component by baking.

"A hydrolysable group bonded to a silicon atom" means a group capable of being converted to an OH group bonded to a silicon atom by hydrolysis.

"Scaly particles" mean particles having a flat shape. The shape of particles can be confirmed by a transmission electron microscope (hereinafter sometimes referred to as TEM).

"The average particle size" means a particle size at a point of 50% on an accumulative volume distribution curve drawn by obtaining the volume-based particle size distribution and taking the whole to be 100%, that is, a volume-based accumulative 50% size (D50). The particle size distribution is obtained from frequency distribution and an accumulative volume distribution curve measured by a laser diffraction/scattering particle size distribution measuring apparatus.

"The aspect ratio" means the ratio of the maximum length relative to the thickness of a particle (maximum length/thickness), and "the average aspect ratio" is an average of aspect ratios of 50 randomly selected particles. The thickness of a particle is measured by an atomic force microscope (hereinafter sometimes referred to as AFM), and the maximum length is measured by a TEM.

In this specification, "to" used to show the range of the numerical values is used to include the numerical values before and after it as the lower limit value and the upper limit value, and unless otherwise specified, the same applies hereinafter.

<<Translucent Structure>>
{First Embodiment}

Figure 1:
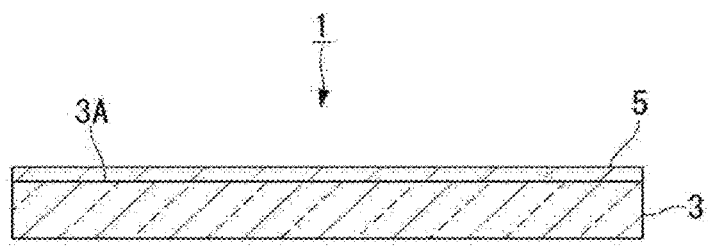
FIG. 1 is a cross-sectional view schematically illustrating a first embodiment of the translucent structure of the present invention.

FIG. 1 is a cross-sectional view schematically illustrating a first embodiment of the translucent structure of the present invention. The translucent structure 1 according to this embodiment comprises a translucent substrate 3 and an antiglare film 5 formed on a first surface 3A of the translucent substrate 3. The antiglare film 5 has a concavo-convex structure on its surface. The surface of the antiglare film 5 constitutes the surface of the translucent structure 1. Accordingly, the translucent structure 1 has the above concavo-convex structure on its surface.

(Translucent Substrate)

The translucent substrate 3 is not limited so long as it can transmit visible light and is preferably transparent. Transparency with respect to the translucent substrate 3 means that it transmits light in a wavelength region of from 400 to 1,100 nm in an amount of at least 80% on average (that is, an average transmittance of at least 80%). The average transmittance with respect to light in a wavelength region of from 400 to 1,100 nm is a value measured by using an integrating sphere.

As a material of the translucent substrate 3, glass or a resin may, for example, be mentioned.

As glass, soda lime glass, borosilicate glass, aluminosilicate glass or alkali-free glass may, for example, be mentioned.

As the resin, polyethylene terephthalate, polycarbonate, triacetyl cellulose or polymethyl methacrylate may, for example, be mentioned.

As the form of the translucent substrate 3, a plate or a film may, for example, be mentioned.

The first surface 3A of the translucent substrate 3 may be smooth or may have irregularities. In view of usefulness of providing the antiglare film 5, it is preferably smooth. The arithmetic mean roughness Ra of the first surface 3A is preferably at most 10 nm, more preferably at most 5 nm, further preferably at most 2 nm, particularly preferably at most 1 nm. Ra here is a value measured by a scanning probe microscope multifunctional unit SPA-400, manufactured by EKO Instruments, at an atomic force microscope (AFM) mode.

The shape of the translucent substrate 3 may not only be a flat shape as shown in FIG. 1 but also may be a shape having a curved surface. In recent years, equipment (for example, a television, a personal computer, a smart phone or an automobile navigation system) having an image display device of which the display surface is a curved surface is in the market. A translucent structure 1 with a translucent substrate 3 having a curved surface is useful for such an image display device.

In a case where the translucent substrate 3 has a curved surface, the entire surface of the translucent substrate 3 may be a curved surface, or may be constituted by a curved surface portion and a flat surface portion. As an example of a case where the entire surface is a curved surface, for example, a translucent substrate having an arc-shaped cross section may be mentioned.

The curved surface here is a macro curved surface to such an extent that the curve can be ignorable in a region observed with a laser microscope.

In a case where the translucent substrate 3 has a curved surface, the curvature radius (hereinafter sometimes referred to as "R") of the curved surface can be properly set depending upon the application of the translucent structure 1, the type of the translucent substrate 3, etc., and is not particularly limited, but is preferably at most 25,000 mm, more preferably from 10 to 5,000 mm, particularly preferably from 50 to 3,000 mm. When R is at most the above upper limit, such a translucent substrate is excellent in the design property as compared with a flat plate. When R is at least the above lower limit, the antiglare film can be uniformly formed even on such a curved surface.

The translucent substrate 3 is preferably a glass plate.

The glass plate may be a smooth glass plate formed by e.g. a float process, a fusion process or a down draw process, or may be figured glass having irregularities on its surface, formed by a roll out process. Further, it may not only be a flat glass plate but also be a glass plate having a curved surface. In a case where the glass plate has a curved surface, the preferred curvature radius of the curved surface is the same as above.

The thickness of the glass plate is not particularly limited. For example, a glass plate having a thickness of at most 10 mm may be used. The thinner the glass plate is, the more absorption of light can be suppressed, and the more preferred for applications in which an improvement of the transmittance is to be achieved. Further, the thinner the glass plate is, the more weight saving of the translucent structure 1 will be achieved.

The glass plate is preferably a tempered glass plate. The tempered glass plate is a glass plate having tempering treatment applied. By the tempering treatment, the strength of glass is improved, and for example, the plate thickness can be reduced while the strength is maintained.

However, in the present invention, a glass plate other than the tempered glass plate may be used, and the glass plate may be properly selected depending upon e.g. the application of the translucent structure 1.

As the tempering treatment, a treatment to form a compression stress layer on the surface of the glass plate is commonly known. The compression stress layer on the glass plate surface improves the strength of the glass plate against scars and impact. As a means of forming the compression stress layer on the glass plate surface, air-quenching method (physical tempering method) and chemical tempering method are representative.

In the air-quenching method, the glass plate surface heated to the vicinity of the glass softening point temperature (for example, from 600 to 700° C.) is quenched e.g. by air-cooling, whereby a temperature difference arises between the surface and the interior of the glass plate, whereby compressive stress is formed in the glass plate surface layer.

By the chemical tempering method, the glass plate is dipped in a molten salt at a temperature of at most the glass strain point temperature to replace ions (for example, sodium ions) in the glass plate surface layer with ions having larger ion radii (for example, potassium ions), whereby compressive stress is formed in the glass plate surface layer.

When the glass plate is thin (for example, less than 2 mm), a temperature difference is less likely to arise between the interior and the surface layer of the glass plate by the air-quenching method, and the glass plate cannot sufficiently be tempered, and accordingly the chemical tempering method is preferably employed.

The glass plate to which the chemical tempering treatment is applied is not particularly limited so long as it has a composition with which chemical tempering is possible, and the glass plate having various compositions may be used. For example, soda lime glass, aluminosilicate glass, borate glass, lithium aluminosilicate glass, borosilicate glass or other various glass may be mentioned. With a view to easily conducting chemical tempering treatment, preferred is glass having a glass composition comprising, as represented by mol percentage based on oxides, from 56 to 75% of $SiO_2$, from 1 to 20% of $Al_2O_3$, from 8 to 22% of $Na_2O$, from 0 to 10% of $K_2O$, from 0 to 14% of MgO, from 0 to 5% of $ZrO_2$ and from 0 to 10% of CaO. Among such glass, aluminosilicate glass is preferred.

The thickness of the glass plate to which the chemical tempering treatment is applied is preferably from 0.4 to 3 mm, particularly preferably from 0.5 to 2.5 mm. When the thickness of the chemically tempered glass plate is at most the upper limit of the above range, the translucent structure 1 is light in weight, and when it is at least the lower limit of the above range, the translucent structure 1 will be excellent in the strength.

Here, the thickness does not change after the chemical tempering treatment. That is, the thickness of the glass plate to which the chemical tempering treatment is to be applied is the thickness of the chemically tempered glass plate (that is, the glass plate after the chemical tempering treatment is applied).

The above-described physical tempering treatment and chemical tempering treatment on glass may be applied before the antiglare film is formed on the glass plate surface or may be applied after the antiglare film is formed.

The translucent substrate 3 may have a functional layer on the surface of the translucent substrate main body.

The translucent substrate main body is the same as one mentioned as the translucent substrate 3.

The functional layer may, for example, be an undercoat layer, an adhesion-improving layer or a protective layer.

The undercoat layer has a function as an alkali barrier layer or a wide-band low refractive index layer. The undercoat layer is preferably a layer formed by applying a coating composition for undercoat containing a hydrolysate (sol-gel silica) of an alkoxysilane to the translucent substrate main body.

(Antiglare Film)

The antiglare film is a film to suppress surface reflection. For example, with respect to an image display device such as a liquid crystal display (LCD) or a plasma display (PDP), if outside light such as indoor lighting (such as fluorescent light) or sunlight is reflected in the display surface, visibility will decrease by the reflected image. As a method of suppressing a decrease of visibility by the reflected image, so-called antiglare treatment of forming an antiglare layer (hereinafter sometimes referred to as an AG layer) on the display surface to diffusely reflect the outside light may be mentioned.

Figure 2:
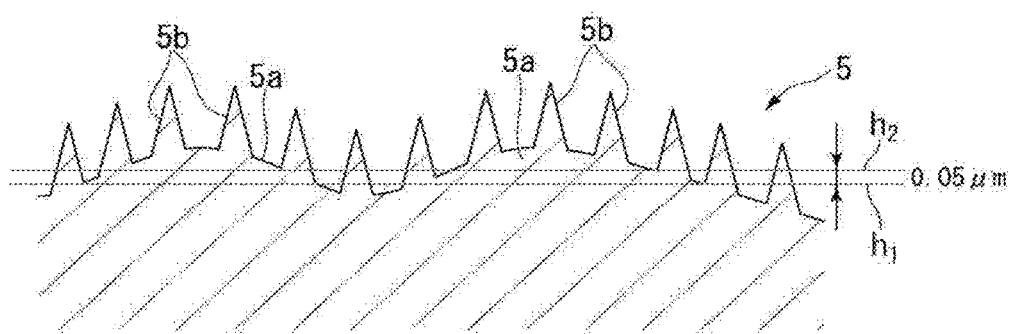
FIG. 2 is a cross-sectional view schematically illustrating a height of 0.05 μm+the bearing height in a surface shape of the translucent structure shown in FIG. 1.
Figure 3:
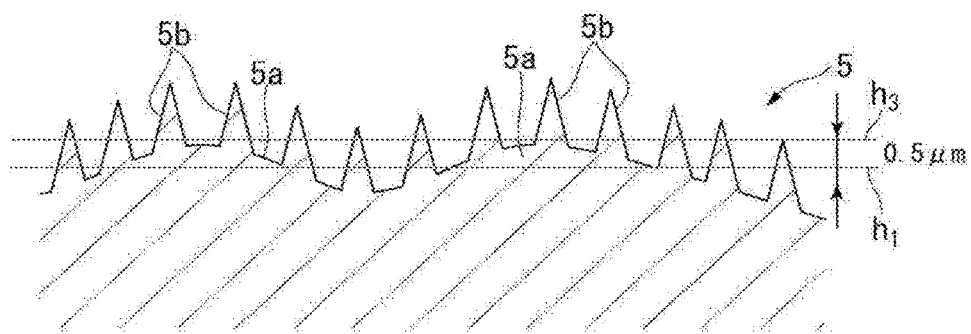
FIG. 3 is a cross-sectional view schematically illustrating a height of 0.5 μm+the bearing height in a surface shape of the translucent structure shown in FIG. 1.

FIG. 2 is a cross-sectional view schematically illustrating a height of 0.05 μm+the bearing height in a surface shape of the antiglare film 5. FIG. 3 is a cross-sectional view schematically illustrating a height of 0.5 μm+the bearing height instead of the height of 0.05 μm+the bearing height in FIG. 2.

The antiglare film 5 has a concavo-convex structure on its surface, and the concavo-convex structure has first convex portions 5a and second convex portions 5b. The antiglare film 5 may locally have a portion where no first convex portions 5a nor second convex portions 5b are present and the translucent substrate 3 is exposed.

The first convex portions 5a are convex portions having a diameter (as calculated as an exact circle) of larger than 10 μm in a cross section at a height $h_2$ of 0.05 μm+the bearing height $h_1$ of a surface shape obtained by measuring the observation region by a laser microscope. That is, convex portions 5a are convex portions the cut surface of which is observed in a cross section at the height $h_2$ of the surface shape, and which have a diameter (as calculated as an exact circle) of larger than 10 μm calculated from the area of the cut surface.

The second convex portions 5b are convex portions having a diameter (as calculated as an exact circle) of larger than 1 μm (preferably larger than 1 μm and at most 20 μm) in a cross section at a height $h_3$ of 0.5 μm+the bearing height $h_1$ of the surface shape. That is, the second convex portions 5b are convex portions the cut surface of which is observed in a cross section at the height $h_3$ of the surface shape, and which have a diameter (as calculated as an exact circle) of larger than 1 μm calculated from the area of the cut surface.

The observation region is within a range of (101 μm to 111 μm)×(135 μm to 148 μm). That is, the observation region is 101 μm×135 μm at minimum and 111 μm×148 μm at maximum. Further, the aspect ratio (the length of the longer side/the length of the shorter side) is usually within a range of from about 1.21 to about 1.46.

Here, the reason why the observation region is defined by the range, the observation region varies depending upon the individual difference of an object lens even when an object lens with the same magnification is used. Since the measurement results are represented by the maximum, minimum and average values in the observation region, there is substantially no difference in the results when an object lens with the same magnification is selected, even if the observation region is slightly different.

In the above concavo-convex structure, the average diameter (as calculated as an exact circle) of the first convex portions 5a in a cross section at a height of 0.05 μm+the bearing height $h_1$ of the surface shape is larger than 10 μm and at most 185 μm, preferably larger than 10 μm and at most 182 μm, more preferably larger than 10 μm and at most 143 μm, further preferably larger than 10 μm and at most 140 μm, particularly preferably larger than 20 μm and at most 135 μm. When the average diameter of the first convex portions 5a is within the above range, a high effect to diffusely reflect the outside light will be obtained, and excellent antiglare property will be obtained.

In the above concavo-convex structure, the maximum height of the first convex portions 5a is from 0.2 to 8 μm, preferably from 0.2 to 7 μm, more preferably from 0.2 to 5 μm, further preferably from 0.7 to 5 μm, particularly preferably from 1.0 to 4 μm. When the maximum height of the first convex portions 5a is at least the lower limit of the above range, a higher effect to diffusely reflect the outside light will be obtained. Usually, more excellent antiglare property will be obtained when the maximum height of the first convex portions 5a is higher within the above range.

The maximum height is a value based on a height at the lowest portion in the above region. That is, it is a value determined by the following $h_p$-$h_v$ (hereinafter sometimes referred to as "P to V").

$h_v$: A height at the lowest portion in the region measured by a laser microscope.

$h_p$: A height of a cross section, based on a cross section of the surface shape cut at a plane in parallel with a plane obtained by gradient calibration by third-order polynomial fitting of the laser microscope data obtained from the surface of the translucent substrate 3 at a height $h_v$, in which the cut surface of the convex portions having a diameter (as calculated as an exact circle) of larger than 10 μm first disappears, when the height of the cross section is increased.

In the concavo-convex structure, the average diameter (as calculated as an exact circle) of the second convex portions 5b in a cross section at a height of 0.5 μm+the bearing height $h_1$ of the surface shape is preferably larger than 1 μm, more preferably larger than 1 μm and at most 20 μm, particularly preferably larger than 1 μm and at most 10 μm. When the average diameter of the second convex portions 5b is within the above range, sparkle will be more suppressed as the density of the second convex portions increases.

In the concavo-convex structure, the average height of the second convex portions 5*b* is from 0.1 to 8 µm, preferably from 0.5 to 8 µm, more preferably from 1 to 8 µm, further preferably from 1.5 to 5 µm, particularly preferably from 1.7 to 4 µm. When the average height of the second convex portions 5*b* is at least the lower limit of the above range, an excellent effect to suppress sparkle will be obtained. When the average height of the second convex portions 5*b* is at most the upper limit of the above range, the antiglare film 5 will be excellent in durability such as abrasion resistance.

The above average height is a value based on the bearing height $h_1$ of the surface shape. That is, it is an average of heights of the respective second convex portions 5*b* in the above region based on the bearing height $h_1$ being a height 0.

The number of the second convex portions 5*b* in the concavo-convex structure is from 0.0004 to 1.2, preferably from 0.0006 to 1.2, more preferably from 0.0006 to 0.5, further preferably from 0.0008 to 0.1, particularly preferably from 0.001 to 0.05 per 1 µm$^2$. When the number of the second convex portions 5*b* per 1 µm$^2$ (the density of the second convex portions 5*b*) is at least the lower limit and at most the upper limit of the above range, sparkle can be sufficiently suppressed. The number is preferably larger within the above range, whereby interference of light refracted by the first convex portions 5*a* is likely to be inhibited, and a high effect to suppress sparkle will be obtained.

The region measured by a laser microscope is randomly selected from the surface on the antiglare film 5 side of the translucent structure 1.

The bearing height $h_1$, the diameters (as calculated as an exact circle) of the cut surface of the convex portions in a cross section at the height $h_3$ of 0.05 µm+the bearing height $h_1$ and in a cross section at the height $h_3$ of 0.5 µm+the bearing height $h_1$, the maximum height (P to V) of the first convex portions 5*a*, the average height of the second convex portion 5*b* and the number of the second convex portions 5*b* are obtained by analyzing the data of the surface shape measured by a laser microscope by an image processing software ("SPIP" manufactured by Image Metorology). A detailed analysis method will be as shown in the aftermentioned Examples.

Refractive Index:

The refractive index of the antiglare film 5 is preferably from 1.36 to 1.46, more preferably from 1.40 to 1.46, particularly preferably from 1.43 to 1.46. When the refractive index of the antiglare film 5 is at most the upper limit of the above range, the outside light reflectance of the surface of the antiglare film 5 tends to be low, and a more excellent antiglare effect will be obtained. When the refractive index of the antiglare film 5 is at least the lower limit of the above range, the antiglare film 5 has a sufficiently high denseness and is excellent in the adhesion to the translucent substrate 3 such as a glass plate.

The refractive index of the antiglare film 5 may be adjusted by the material of the matrix of the antiglare film 5, the porosity of the antiglare film 5, addition of a substance having an optional refractive index to the matrix, etc. For example, the refractive index can be lowered by increasing the porosity of the antiglare film 5. Further, the refractive index of the antiglare film 5 can be lowered by adding a substance having a low refractive index (such as solid silica particles or hollow silica particles) to the matrix.

The material of the antiglare film 5 (e.g. the first convex portions 5*a* and the second convex portions 5*b*) can be properly set considering the refractive index, etc. In a case where the antiglare film 5 has a refractive index of from 1.40 to 1.46, as the material of the antiglare film 5, silica or titania may, for example, be mentioned.

The antiglare film 5 preferably contains silica as the main component. When it contains silica as the main component, the refractive index (reflectance) of the antiglare film 5 tends to be low. Further, the antiglare film 5 will have favorable optical stability, etc. Further, in a case where the material of the translucent substrate 3 is glass, the antiglare film 5 will have favorable adhesion to such a translucent substrate 3.

In a case where the antiglare film 5 contains silica as the main component, the antiglare film 5 may be composed solely of silica, or may contain a component other than silica in a small amount. Such a component may be one or more ions selected from Li, B, C, N, F, Na, Mg, Al, P, S, K, Ca, Ti, V, Cr, Mn, Fe, Co, Ni, Cu, Zn, Ga, Sr, Y, Zr, Nb, Ru, Pd, Ag, In, Sn, Hf, Ta, W, Pt, Au, Bi and lanthanoids, and/or a compound such as an oxide.

The antiglare film 5 may, for example, be one formed of a coating composition containing at least one of a silica precursor (A) and particles (C), and a liquid medium (B). The coating composition may contain, as the case requires, a binder (D) other than the silica precursor (A), another additive (E), etc.

In a case where the coating composition contains the silica precursor (A), the matrix of the antiglare film 5 contains as the main component silica derived from the silica precursor (A). The antiglare film 5 may be composed of particles (C). In such a case, the particles (C) are preferably silica particles. The antiglare film 5 may be one having the particles (C) dispersed in the matrix.

A method for forming the antiglare film 5 by using the coating composition will be described in detail hereinafter.

The antiglare film containing silica as the main component may, for example, be one formed of a coating composition containing the silica precursor (A), one formed of a coating composition containing silica particles as the particles (C) or one formed of a coating composition containing the silica precursor (A) and silica particles as the particles (C).

The 60° specular glossiness on the surface of the antiglare film 5 is preferably at most 90%, more preferably at most 70%, further preferably at most 50%. The 60° specular glossiness on the surface of the antiglare film 5 is an index to the antiglare effect. When the 60° specular glossiness is at most the above upper limit, the antiglare effect will be sufficiently obtained.

"The 60° specular glossiness" is measured without eliminating back (that is, the opposite side from the side on which the antiglare film is formed) reflection, by the method in JIS Z8741: 1997 (ISO 2813: 1994).

The translucent structure 1 is preferably such that the average diameter (as calculated as an exact circle) of the first convex portions 5*a* in a cross section at a height of 0.05 µm+the bearing height of the surface shape of the antiglare film 5 is larger than 10 µm and at most 143 µm, the maximum height of the first convex portions 5*a* is from 0.2 to 5.0 µm based on the height at the lowest portion in the above region, the number of the second convex portions 5*b* is from 0.0004 to 1.2 per 1 µm$^2$, and the average height of the second convex portions 5*b* is from 1 to 8 µm based on the above bearing height.

(Haze)

The haze of the translucent structure 1 is preferably higher than 10% and at most 70%, more preferably higher than 10% and at most 60%, particularly preferably higher than 10% and at most 50%. When the haze is at least the lower limit of the above range, more excellent antiglare property will be obtained.

"The haze" is measured by a method in accordance with JIS K7136: 2000 (ISO14782: 1999).

(Sparkle Index S)

The translucent structure 1 has a sparkle index S of preferably less than 100, more preferably less than 80, particularly preferably less than 60, which is measured by disposing the translucent structure 1 on iPhone 4 manufactured by Apple Inc. so that the surface having the concavo-convex structure (the surface on the antiglare film 5 side) faces upward, using EyeScale ISC-A manufactured by I System Corporation. The lower the sparkle index S is, the more sparkle is suppressed.

<Advantageous Effects>

The above-described translucent structure 1 has a concavo-convex structure having the first convex portions 5a and the second convex portions 5b with a number of the second convex portions 5b being from 0.0004 to 1.2 per 1 μm$^2$ on its surface (the surface on the antiglare film 5 side), and is thereby excellent in the antiglare property and has its sparkle sufficiently suppressed.

It is considered that of the translucent structure 1, the first convex portions 5a mainly contribute to the antiglare property by diffusely reflecting the outside light, and the second convex portions 5b mainly contribute to suppression of sparkle. It is estimated that if the concavo-convex structure is composed solely of the first convex portions 5a, light which enters the antiglare film 5 from the translucent substrate 3 side is refracted on the surface of the first convex portions 5a, and the refracted light rays interfere with each other in the vicinity of the surface of the first convex portions 5a, thus causing sparkle. The second convex portions 5b are estimated to suppress interference of the refracted light rays to suppress sparkle.

<Process for Producing Translucent Structure>

As a process for producing the translucent structure 1, for example, a process for producing a translucent structure may be mentioned, which comprises a step of applying a coating composition to the translucent substrate to form a coating film and baking the coating film to form an antiglare film, wherein the coating composition contains at least one of a silica precursor (A) and particles (C), and a liquid medium (B), and the liquid medium (B) contains a liquid medium (B1) having a boiling point of at most 150° C. in an amount of at least 86 mass % based on the entire amount of the liquid medium (B), and wherein application of the coating composition is carried out by electrifying the coating composition and spraying it by an electrostatic coating apparatus equipped with an electrostatic coating gun having a rotary atomizing head.

As an embodiment of the above production process, a production process may be mentioned, which comprises a step of preparing the coating composition (hereinafter sometimes referred to as a coating composition preparation step), a step of electrifying and spraying the coating composition by an electrostatic coating apparatus equipped with an electrostatic coating gun having a rotary atomizing head to apply the coating composition to the translucent substrate 3 thereby to form a coating film (hereinafter referred to as an application step) and a step of baking the coating film to form an antiglare film 5 (hereinafter sometimes referred to as a baking step).

The above production process may have, as the case requires, before forming the antiglare film 5, a step of forming a functional layer on the surface of the translucent substrate main body to prepare the translucent substrate 3, or after forming the antiglare film 5, a step of applying known post processing.

[Coating Corn Position Preparation Step]

The coating composition contains at least one of a silica precursor (A) and particles (C), and a liquid medium (B).

In a case where the coating composition contains no silica precursor (A) and contains the particles (C), the average particle size of the particles (C) is preferably at most 30 nm.

The coating composition may contain, as the case requires, within a range not to impair the effects of the present invention, a binder (D) other than the silica precursor (A), another additive (E), etc.

(Silica Precursor (A))

The silica precursor (A) may, for example, be a silane compound (A1) having a hydrocarbon group and a hydrolysable group bonded to a silicon atom or its hydrolytic condensate, an alkoxysilane (excluding the silane compound (A1)) or its hydrolytic condensate (sol gel silica), or silazane.

In the silane compound (A1), the hydrocarbon group bonded to a silicon atom may be a monovalent hydrocarbon group bonded to one silicon atom, or may be a bivalent hydrocarbon group bonded to two silicon atoms. The monovalent hydrocarbon group may, for example, be an alkyl group, an alkenyl group or an aryl group. The bivalent hydrocarbon group may, for example, be an alkylene group, an alkenylene group or an arylene group.

The hydrocarbon group may have a group having one or at least two in combination selected from —O—, —S—, —CO— and —NR'— (wherein R' is a hydrogen atom or a monovalent hydrocarbon group) between carbon atoms.

The hydrolysable group bonded to a silicon atom, may, for example, be an alkoxy group, an acyloxy group, a ketoxime group, an alkenyloxy group, an amino group, an aminoxy group, an amide group, an isocyanate group or a halogen atom. Among them, in view of the balance between the stability and hydrolyzability of the silane compound (A1), preferred is an alkoxy group, an isocyanate group or a halogen atom (particularly a chlorine atom).

The alkoxy group is preferably a $C_{1-3}$ alkoxy group, more preferably a methoxy group or an ethoxy group.

In a case where the silane compound (A1) has a plurality of hydrolysable groups, the hydrolysable groups may be the same groups or different groups, and they are preferably the same groups in view of availability.

The silane compound (A1) may, for example, be a compound represented by the after-described formula (I), an alkoxysilane having an alkyl group (such as methyltrimethoxysilane or ethyltriethoxysilane), an alkoxysilane having a vinyl group (such as vinyltrimethoxysilane or vinyltriethoxysilane), an alkoxysilane having an epoxy group (such as 2-(3,4-epoxycyclohexyl)ethyltrimethoxysilane, 3-glycidoxypropyltrimethoxysilane, 3-glycidoxypropylmethyldiethoxysilane or 3-glycidoxypropyltriethoxysilane) or an alkoxysilane having an acryloyloxy group (such as 3-acryloyloxypropyltrimethoxysilane).

The silane compound (A1) is preferably a compound represented by the following formula (I), whereby the resulting antiglare film 5 is less likely to undergo cracking or film peeling even though it is thick.

$$R_{3-p}L_pSi\text{-}Q\text{-}SiL_pR_{3-p} \tag{I}$$

In the formula (I), Q is a bivalent hydrocarbon group (which may have a group having one or at least two in combination selected from —O—, —S—, —CO— and —NR'— (wherein R' is a hydrogen atom or a monovalent hydrocarbon group) between carbon atoms). The bivalent hydrocarbon group may be the above-described one.

Q is preferably a $C_{2-8}$ alkylene group, more preferably a $C_{2-6}$ alkylene group, whereby such a compound is easily available, and the resulting antiglare film 5 is less likely to undergo cracking or film peeling even though it is thick.

In the formula (I), L is a hydrolysable group. The hydrolysable group may be the above-described one, and the preferred embodiment is also the same.

R is a hydrogen atom or a monovalent hydrocarbon group. The monovalent hydrocarbon may be the above-described one.

p is an integer of from 1 to 3. p is preferably 2 or 3, whereby the reaction rate will not be too low, and is particularly preferably 3.

The alkoxysilane (excluding the above silane compound (A1)) may, for example, be a tetraalkoxysilane (such as tetramethoxysilane, tetraethoxysilane, tetrapropoxysilane or tetrabutoxysilane), an alkoxysilane having a perfluoropolyether group (such as perfluoropolyether triethoxysilane) or an alkoxysilane having a perfluoroalkyl group (such as perfluoroethyltriethoxysilane).

Hydrolysis and condensation of the silane compound (A1) and the alkoxysilane (excluding the silane compound (A1)) may be carried out by a known method.

For example, in the case of a tetraethoxysilane, hydrolysis and condensation are carried out by using water in an amount of at least 4 molar times of the tetraalkoxysilane, and an acid or alkali as a catalyst.

The acid may, for example, be an inorganic acid (such as $HNO_3$, $H_2SO_4$ or HCl) or an organic acid (such as formic acid, oxalic acid, monochloroacetic acid, dichloroacetic acid or trichloroacetic acid). The alkali may, for example, be ammonia, sodium hydroxide or potassium hydroxide. The catalyst is preferably an acid in view of long-term storage property of the hydrolytic condensate of the silane compound (A).

The silica precursor (A) may be used alone or in combination of two or more.

The silane precursor (A) preferably contains either one or both of the silane compound (A1) and its hydrolytic condensate, with a view to preventing cracking and film peeling of the antiglare film 5.

The silica precursor (A) preferably contains either one or both of the tetraalkoxysilane and its hydrolytic condensate, from the viewpoint of the abrasion resistance of the antiglare film 5.

The silica precursor (A) particularly preferably contains either one or both of the silane compound (A1) and its hydrolytic condensate, and either one or both of the tetraalkoxysilane and its hydrolytic condensate.

(Liquid Medium (B))

The liquid medium (B) is, in a case where the coating composition contains the silica precursor (A), to dissolve or disperse the silica precursor (A), and in a case where the coating composition contains the particles (C), to disperse the particles (C). In a case where the coating composition contains both the silica precursor (A) and the particles (C), the liquid medium (B) may be one having both function as a solvent or dispersion medium to dissolve or disperse the silica precursor (A) and function as a dispersion medium to disperse the particles (C).

The liquid medium (B) contains at least a liquid medium (B1) having a boiling point of at most 150° C. The boiling point of the liquid medium (B1) is preferably from 50 to 145° C., more preferably from 55 to 140° C.

When the boiling point of the liquid medium (B1) is at most 150° C., a film will have more preferred antiglare performance, which is obtained by applying the coating composition to the translucent substrate 3 by using an electrostatic coating apparatus equipped with an electrostatic coating gun having a rotary atomizing head, followed by baking. When the boiling point of the liquid medium (B1) is at least the lower limit of the above range, the concavoconvex structure can be formed while the shape of droplets of the coating composition attached to the translucent substrate 3 is sufficiently kept.

The liquid medium (B1) may, for example, be water, an alcohol (such as methanol, ethanol, isopropyl alcohol, n-butyl alcohol, isobutyl alcohol or 1-pentanol), a ketone (such as acetone, methyl ethyl ketone or methyl isobutyl ketone), an ether (such as tetrahydrofuran or 1,4-dioxane), a cellosolve (such as methyl cellosolve or ethyl cellosolve), an ester (such as methyl acetate or ethyl acetate) or a glycol ether (such as ethylene glycol monomethyl ether or ethylene glycol monoethyl ether).

The liquid medium (B1) may be used alone or in combination of two or more.

The liquid medium (B) may further contain, as the case requires, a liquid medium other than the liquid medium (B1), that is, a liquid medium having a boiling point of higher than 150° C.

Such another liquid medium may, for example, be an alcohol, a ketone, an ether, a cellosolve, an ester, a glycol ether, a nitrogen-containing compound or a sulfur-containing compound.

The alcohol may, for example, be diacetone alcohol, 1-hexanol or ethylene glycol.

The nitrogen-containing compound may, for example, be N,N-dimethylacetamide, N,N-dimethylformamide or N-methylpyrrolidone.

The glycol ether may, for example, be ethylene glycol monobutyl ether.

The sulfur-containing compound may, for example, be dimethyl sulfoxide.

Such another liquid medium may be used alone or in combination of two or more.

Since water is necessary for hydrolysis of the alkoxysilane or the like as the silica precursor (A), the liquid medium (B) contains at least water as the liquid medium (B1) unless the liquid medium is replaced after hydrolysis.

In such a case, the liquid medium (B) may be water alone or may be a mixture of water and another liquid. Such another liquid may be the liquid medium (B1) other than water or may be another liquid medium, for example, an alcohol, a ketone, an ether, a cellosolve, an ester, a glycol ether, a nitrogen-containing compound or a sulfur-containing compound. Among them, as the solvent of the silica precursor (A), an alcohol is preferred, and methanol, ethanol, isopropyl alcohol or butanol is particularly preferred.

(Particles (C))

The particles (C) constitute the antiglare film solely or together with the matrix derived from the silica precursor (A).

In a case where the coating composition contains no silica precursor (A) and contains the particles (C), the average particle size of the particles (C) is preferably at most 30 nm.

The particles (C) may, for example, be scaly particles (C1) or other particles (C2) other than the scaly particles (C1).

Scaly Particles (C1):

The average aspect ratio of the scaly particles (C1) is preferably from 50 to 650, more preferably from 100 to 350, further preferably from 170 to 240. When the average aspect ratio of the scaly particles (C1) is at least 50, cracking and film peeling of the antiglare film can be sufficiently suppressed even though the antiglare film is thick. When the average aspect ratio of the scaly particles (C1) is at most 650, such particles have favorable dispersion stability in the coating composition.

The average particle size of the scaly particles (C1) is preferably from 0.08 to 0.42 μm, more preferably from 0.17 to 0.21 μm. When the average particle size of the scaly particles (C1) is at least 0.08 μm, cracking and film peeling of the antiglare film can be sufficiently suppressed even though the antiglare film is thick. When the average particle size of the scaly particles (C1) is at most 0.42 μm, such particles have favorable dispersion stability in the coating composition.

The scaly particles (C1) may, for example, be scaly silica particles, scaly alumina particles, scaly titania or scaly zirconia, and are preferably scaly silica particles with a view to suppressing an increase of the refractive index of the film and lowering the reflectance.

The scaly silica particles are flaky silica primary particles, or silica secondary particles having a plurality of flaky silica primary particles aligned and overlaid with their planes in parallel with each other. The silica secondary particles are usually particles having a laminated structure.

The scaly silica particles may be composed of either one of the silica primary particles and the silica secondary particles or both of them.

The thickness of the silica primary particles is preferably from 0.001 to 0.1 μm. When the thickness of the silica primary particles is within the above range, scaly silica secondary particles having one or a plurality of the silica primary particles aligned with their planes in parallel with each other can be formed.

The ratio of the minimum length to the thickness (minimum length/thickness) of the silica primary particles is preferably at least 2, more preferably at least 5, further preferably at least 10.

The thickness of the silica secondary particles is preferably from 0.001 to 3 μm, more preferably from 0.005 to 2 μm.

The ratio of the minimum length to the thickness (minimum length/thickness) of the silica secondary particles is preferably at least 2, more preferably at least 5, particularly preferably at least 10.

The silica secondary particles are preferably independently present without fusion.

The $SiO_2$ purity of the scaly silica particles is preferably at least 95 mass %, more preferably at least 99 mass %.

To prepare the coating composition, a powder which is agglomerates of a plurality of the scaly silica particles or a dispersion having the powder dispersed in a liquid medium is used. The silica concentration in the dispersion is preferably from 1 to 80 mass %.

The powder or the dispersion may contain not only the scaly silica particles but also irregular particles which form at the time of producing the scaly silica particles. The scaly silica particle are obtained, for example, by disintegrating and dispersing silica tertiary particles (hereinafter sometimes referred to as silica agglomerates) in the form of agglomerates having gaps formed by the scaly silica particles agglomerated and irregularly overlaid. The irregular silica particles are in a state such that the silica agglomerates are formed into smaller particles to a certain extent but not into respective scaly silica particles, and a plurality of scaly silica particles form agglomerates. If the irregular silica particles are contained, the denseness of the antiglare film to be formed may be decreased, whereby cracking or film peeling is likely to occur. Accordingly, the content of the irregular silica particles in the powder or the dispersion is preferably as low as possible.

The irregular silica particles and the silica agglomerates look black by observation with a TEM. On the other hand, the flaky silica primary particles and silica secondary particles look transparent or semitransparent by observation with a TEM.

As the scaly silica particles, a commercially available product may be used, or particles produced may be used.

The scaly silica particles are preferably ones produced by the production process as disclosed in JP-A-2014-94845. This production process comprises a step of subjecting a silica powder containing silica agglomerates having scaly silica particles agglomerated, to acid treatment at a pH of at most 2, a step of subjecting the silica powder subjected to the acid treatment, to alkali treatment at a pH of at least 8 to deflocculate the silica agglomerates, and a step of wet disintegrating the silica powder subjected to the alkali treatment to obtain scaly silica particles. According to the production process, formation of irregular silica particles in the production process can be suppressed, and a powder or dispersion having a low content of irregular silica particles can be obtained as compared with a known production process (for example, the process as disclosed in Japanese Patent No. 4063464).

Particles (C2):

As particles (C2) other than the scaly particles (C1), metal oxide particles, metal particles, pigment particles or resin particles may, for example, be mentioned.

As a material of the metal oxide particles, $Al_2O_3$, $SiO_2$, $SnO_2$, $TiO_2$, $ZiO_2$, $ZnO$, $CeO_2$, Sb-containing SnOx (ATO), Sn-containing $In_2O_3$ (ITO) or $RuO_2$ may, for example, be mentioned. As a material of the metal oxide particles, since the matrix preferably used for the antiglare film of the present invention is silica, and in such a case, $SiO_2$ having the same refractive index as the matrix is preferred.

As a material of the metal particles, a metal (such as Ag or Ru) or an alloy (such as AgPd or RuAu) may, for example, be mentioned.

As the pigment particles, an inorganic pigment (such as titanium black or carbon black) or an organic pigment may be mentioned.

As the material of the resin particles, an acrylic resin, a polystyrene or a melamine resin may, for example, be mentioned.

As the shape of the particles (C2), spheres, ellipses, needles, plates, rods, cones, columns, cubes, cuboids, diamonds, stars, irregular particles, or a combination thereof may, for example, be mentioned. Such other particles may be present in a state where the respective particles are independent of one another, the particles are connected in a chain, or the particles are agglomerated.

The particles (C2) may be solid particles, may be hollow particles or may be perforated particles such as porous particles.

The particles (C2) are preferably silica particles (excluding the scaly silica particles) such as spherical silica particles, rod silica particles or needle silica particles. Among them, preferred are spherical silica particles, more preferred are porous spherical silica particles, in that the resulting translucent structure 1 has a sufficiently high haze and has a substantially low 60° specular glossiness on the surface of the antiglare film 5 and as a result, a sufficient antiglare effect will be obtained.

The average particle size of the particles (C2) is preferably from 0.3 to 2 µm, more preferably from 0.5 to 1.5 µm. When the average particle size of the particles (C2) is at least 0.3 µm, a sufficient antiglare effect will be obtained. When the average particle size of the particles (C2) is at most 2 µm, the particles have favorable dispersion stability in the coating composition.

The BET specific surface area of the porous spherical silica particles is preferably from 200 to 300 m²/g.

The pore volume of the porous spherical silica particles is preferably from 0.5 to 1.5 cm³/g.

As a commercially available product of the porous spherical silica particles, LIGHTSTAR (registered trademark) series manufactured by Nissan Chemical Industries, Ltd. may be mentioned.

The particles (C) may be used alone or in combination of two or more.

The particles (C) preferably contain the scaly particles (C1) and may further contain the particles (C2). By the particles (C) containing the scaly particles (C1), the haze of the antiglare film 5 is increased, and more excellent antiglare performance will be obtained. Further, in a case where the scaly particles (C1) are contained, as compared with the particles (C2), cracking or film peeling is less likely to occur when the antiglare film 5 is made thick.

(Binder (D))

The binder (D) (excluding the silica precursor (A)) may, for example, be an inorganic substance or a resin which can be dissolved or dispersed in the liquid medium (B).

The inorganic substance may, for example, be a metal oxide precursor (metal: titanium, zirconium or the like) other than silica.

The resin may, for example, be a thermoplastic resin, a thermosetting resin or an ultraviolet curable resin.

(Additive (E))

The additive (E) may, for example, be an organic compound (E1) having a polar group, an ultraviolet absorber, an infrared reflecting agent, an infrared absorber, an antireflecting agent, a surfactant for improving the levelling properties, or a metal compound for improving the durability.

In a case where the coating composition contains the particles (C), by incorporating the organic compound (E1) having a polar group into the resin composition, agglomeration of the particles (C) by electrostatic force in the coating composition can be suppressed.

The organic compound (E1) having a polar group is, in view of an effect to suppress agglomeration of the particles (C), preferably one having a hydroxy group and/or a carbonyl group in its molecule, more preferably one having at least one member selected from the group consisting of a hydroxy group, an aldehyde group (—CHO), a ketone (—C(=O)—), an ester bond (—C(=O)O—) or a carboxy group (—COOH) in its molecule, further preferably one having at least one member selected from the group consisting of a carboxy group, a hydroxy group, an aldehyde group and a ketone in its molecule.

The organic compound (E1) having a polar group may, for example, be an unsaturated carboxylic acid polymer, a cellulose derivative, an organic acid (excluding an unsaturated carboxylic acid polymer) or a terpene compound. The organic compound (E1) may be used alone or in combination of two or more.

As the unsaturated carboxylic acid polymer, polyacrylic acid may be mentioned.

As the cellulose derivative, polyhydroxyalkyl cellulose may be mentioned.

As the organic acid (excluding the unsaturated carboxylic acid polymer), formic acid, oxalic acid, monochloroacetic acid, dichloroacetic acid, trichloroacetic acid, citric acid, tartaric acid or maleic acid may, for example, be mentioned.

Here, in a case where an organic acid is used as the catalyst for hydrolysis of the alkoxysilane or the like, said organic acid is included in the organic acid as the organic compound (E1).

Terpene means a hydrocarbon having a composition $(C_5H_8)_n$ (wherein n is an integer of at least 1) having isoprene $(C_5H_8)$ as constituting units. A terpene compound means a terpene having a functional group derived from terpene. The terpene compound includes ones differing in the degree of unsaturation.

Some terpene compounds function as a liquid medium, however, ones which are "hydrocarbon having a composition of $(C_5H_8)_n$ comprising isoprene as constituting units" are considered to correspond to the terpene derivative but not to the liquid medium.

The terpene derivative may, for example, be a terpene alcohol (such as α-terpineol, terpine-4-ol, L-menthol, (±)citronellol, myrtenol, borneol, nerol, farnesol or phytol), a terpene aldehyde (such as citral, β-cyclocitral or perillaldehyde), a terpene ketone (such as (±)camphor or β-ionone), a terpene carboxylic acid (such a citronellic acid or abietic acid) or a terpene ester (such as terpinyl acetate or menthyl acetate).

The surfactant for improving the levelling property may, for example, be a silicone oil-based surfactant or an acrylic-based surfactant.

The metal compound for improving the durability is preferably a zirconium chelate compound, a titanium chelate compound, an aluminum chelate compound or the like. The zirconium chelate compound may, for example, be zirconium tetraacetylacetonate or zirconium tributoxy stearate.

(Composition)

In a case where the coating composition contains the silica precursor (A) and the particles (C), the total content of the silica precursor (A) and the particles (C) in the coating composition is preferably from 30 to 100 mass %, more preferably from 40 to 100 mass % based on the solid content (100 mass %) in the coating composition (provided that the content of the silica precursor (A) is as calculated as $SiO_2$). When the total content of the silica precursor (A) and the particles (C) is at least the lower limit of the above range, the resulting antiglare film is excellent in the adhesion to the translucent substrate 3. When the total content of the silica precursor (A) and the particles (C) is at most the upper limit of the above range, cracking or film peeling of the antiglare film 5 can be suppressed.

In a case where the coating composition contains the silica precursor (A), the content of the silica precursor (A) (as calculated as $SiO_2$) in the coating composition is preferably from 35 to 95 mass %, more preferably from 50 to 90 mass % based on the solid content (100 mass %) (provided that the content of the silica precursor (A) is as calculated as $SiO_2$) in the coating composition. When the content of the silica precursor (A) is at least the lower limit of the above range, the resulting antiglare film has a sufficient adhesion strength to the translucent substrate 3. When the content of the silica precursor (A) is at most the upper limit of the above range, cracking or film peeling of the antiglare film 5 can be sufficiently suppressed even though the antiglare film 5 is thick.

In a case where the coating composition contains the silica precursor (A) and the silica precursor (A) contains either one or both of the silane compound (A1) and its hydrolytic condensate, the proportion of the silane compound (A1) and its hydrolytic condensate in the silane precursor (A) is preferably from 5 to 100 mass % based on the solid content (100 mass %) of the silica precursor (A) as calculated as $SiO_2$. When the proportion of the silane compound (A1) and its hydrolytic condensate is at least the lower limit of the above range, cracking and film peeling of the antiglare film 5 can be sufficiently suppressed even though the antiglare film is thick.

In a case where the coating composition contains the silica precursor (A) and the silica precursor (A) contains either one or both of the tetraalkoxysilane and its hydrolytic condensate, the proportion of either one or both of the tetraalkoxysilane and its hydrolytic condensate in the silica precursor (A) is preferably from 60 to 100 mass % based on the solid content (100 mass %) of the silica precursor (A) as calculated as $SiO_2$. When the proportion of either one or both of the tetraalkoxysilane and its hydrolytic condensate is at least the lower limit of the above range, the resulting antiglare film 5 is more excellent in the abrasion resistance.

In a case where the silica precursor (A) contains either one or both of the silane compound (A1) and its hydrolytic condensate and either one or both of the tetraalkoxysilane and its hydrolytic condensate, it is preferred that based on the solid content (100 mass %) of the silica precursor (A) as calculated as $SiO_2$, the proportion of either one or both of the silane compound (A1) and its hydrolytic condensate is higher than 0 mass % and at most 50 mass % (more preferably higher than 0 mass % and at most 30 mass %) and the proportion of either one or both of the tetraalkoxysilane and its hydrolytic condensate is at least 50 mass % and less than 100 mass % (more preferably at least 70 mass % and less than 100 mass %).

The content of the liquid medium (B) in the coating composition is an amount in accordance with the solid content concentration of the coating composition.

The solid content concentration of the coating composition is preferably from 1 to 8 mass %, more preferably from 2 to 6 mass % based on the entire amount (100 mass %) of the coating composition. When the solid content concentration is at least the lower limit of the above range, the liquid amount of the coating composition can be reduced. When the solid content concentration is at most the upper limit of the above range, the uniformity of the film thickness of the antiglare film will improve.

The solid content concentration of the coating composition is the total content of all the components except for the liquid medium (B) in the coating composition. Here, the content of the silica precursor (A) is as calculated as $SiO_2$.

The content of the liquid medium (B1) having a boiling point of at most 150° C. in the coating composition is at least 86 mass % based on the entire amount of the liquid medium (B). By the coating composition containing the liquid medium (B1) in a proportion of at least 86 mass %, an antiglare film having more preferred performance will be obtained when such a coating composition is applied to the translucent substrate by an electrostatic coating apparatus equipped with an electrostatic coating gun having a rotary atomizing head, followed by baking. If the proportion of the liquid medium (B1) is less than 86 mass %, the concavo-convex structure will not be formed since the obtainable film will be smoothened before the solvent is volatilized and dried, and the film after baking may not be an antiglare film.

The content of the liquid medium (B1) is preferably at least 90 mass % based on the entire amount of the liquid medium (B). The content of the liquid medium (B1) may be 100 mass % based on the entire amount of the liquid medium (B).

In a case where the coating composition contains the particles (C), the content of the particles (C) is preferably from 3 to 40 mass %, more preferably from 5 to 30 mass % based on the solid content (100 mass %) (provided that the content of the silica precursor (A) is as calculated as $SiO_2$) in the coating composition. When the content of the particles (C) is at least the lower limit of the above range, the resulting translucent structure will have a sufficiently high haze and has a sufficiently low 60° specular glossiness on the surface of the antiglare film, whereby a sufficient antiglare effect will be obtained. When the content of the particles (C) is at most the upper limit of the above range, sufficient abrasion resistance will be obtained.

In a case where the coating composition contains the particles (C) and the particles (C) contain the scaly particles (C1), the content of the scaly particles (C1) is preferably at least 20 mass %, more preferably at least 30 mass % based on the entire amount (100 mass %) of the particles (C). The upper limit is particularly limited, and may be 100 mass %. When the proportion of the scaly particles (C1) is at least the above lower limit, a more excellent antiglare effect will be obtained. Further, cracking or film peeling of the antiglare film can be sufficiently suppressed even though the antiglare film is thick.

(Viscosity)

The viscosity (hereinafter sometimes referred to as "liquid viscosity") of the coating composition at the application temperature is preferably at most 0.003 Pa·s (at most 3 mPa·s), particularly preferably from 0.001 to 0.003 Pa·s. When the liquid viscosity is at most the above upper limit, droplets formed when the liquid composition is sprayed will be finer, and an antiglare film having a desired surface shape tends to be formed. When the liquid viscosity is at least the above lower limit, the surface concavo-convex shape of the antiglare film will be uniform.

The viscosity of the coating composition is a value measured by a type B viscometer.

(Preparation Method)

The coating composition may be prepared, for example, by dissolving the silane precursor (A) in the liquid medium (B) to prepare a solution, and as the case requires, mixing the liquid medium (B) additionally, a dispersion of the particles (C), or the like.

In a case where the particles (C) contain the scaly particles (C1), and the silica precursor (A) contains a hydrolytic condensate of the tetraalkoxysilane, with a view to producing an antiglare film having desired performance with good reproducibility at a high level, it is preferred that a solution of the tetraalkoxysilane or a solution of a mixture of the tetraalkoxysilane and its hydrolytic condensate, is mixed with a dispersion of the scaly particles (C1), and the tetraalkoxysilane is hydrolyzed and condensed in the presence of the scaly particles (C1).

[Application Step]

Application of the coating composition to the translucent substrate is carried out by electrifying the coating composition and spraying it by an electrostatic coating apparatus equipped with an electrostatic coating gun having a rotary atomizing head, whereby a coating film of the coating composition can be formed on the translucent substrate.

(Electrostatic Coating Apparatus)

Figure 4:
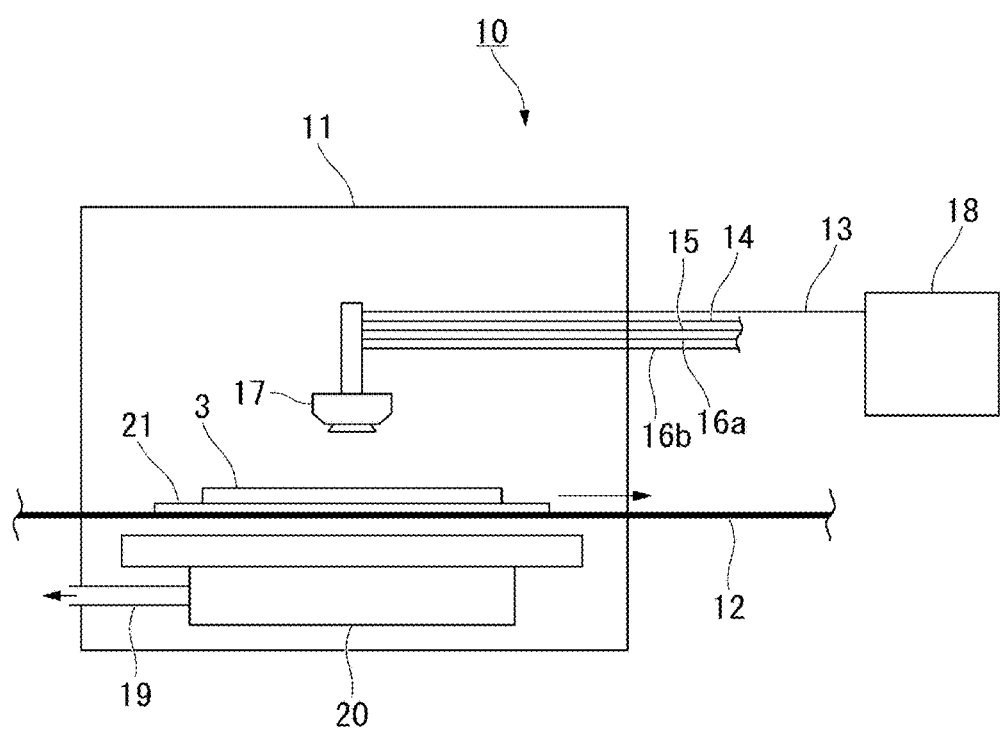
FIG. 4 is a view schematically illustrating an example of an electrostatic coating apparatus.

FIG. 4 is a view schematically illustrating an example of an electrostatic coating apparatus.

The electrostatic coating apparatus 10 comprises a coating booth 11, a chain conveyor 12, a plurality of electrostatic coating guns 17, a high voltage generating apparatus 18 and an exhaust box 20.

The chain conveyor 12 passes through the coating booth 11 and carries an electrically conductive substrate 21 and a translucent substrate 3 placed thereon in a predetermined direction.

The plurality of electrostatic coating guns 17 are aligned above the chain conveyor 12 in the coating booth 11, in order in a direction at right angle to the direction of carriage of the translucent substrate 3, and with each of the electrostatic coating guns 17, a high voltage cable 13, a coating composition supply line 14, a coating composition recovery line 15 and two-system air supply lines 16a and 16b are connected.

The high voltage generating apparatus 18 is connected with the electrostatic coating gun 17 via the high voltage cable 13 and is grounded.

The exhaust box 20 is disposed below the electrostatic coating gun 17 and the chain conveyor 12, and an exhaust duct 19 is connected with it.

The electrostatic coating gun 17 is fixed to a nozzle set frame (not shown). By the nozzle set frame, the distance from the nozzle tip of the electrostatic coating gun 17 to the translucent substrate 3, the angle of the electrostatic coating gun 17 relative to the translucent substrate 3, the direction of alignment of the plurality of electrostatic coating guns 17 relative to the direction of carriage of the translucent substrate 3, etc. can be adjusted.

Since a high voltage is applied to the nozzle tip of the electrostatic coating gun 17, the coating composition supply line 14 and the recovery line 15, a portion connecting the electrostatic coating gun 17, the supply line 14 and the recovery line 15, with a portion made of a metal (for example, a metal portion such as a side wall perforated portion of the nozzle set frame or the coating booth 11) is insulated with a resin or the like.

The chain conveyor 12 comprises a plurality of plastic chains, and part of the plurality of plastic chains are conductive plastic chains. The conductive plastic chains are grounded via metal chains (not shown) into which the plastic chains are inserted and their ground cable (not shown) of a drive motor (not shown).

The electrically conductive substrate 21 is used to sufficiently ground the translucent substrate 3 placed thereon, via the electrically conductive plastic chains of the chain conveyor 12, the metal chains and the ground cable of the drive motor. By the translucent substrate 3 being sufficiently grounded, the coating composition will be uniformly attached to the translucent substrate 3.

As the electrically conductive substrate 21, a metal mesh tray is preferred, by which a temperature decrease of the translucent substrate 3 is suppressed, and the temperature distribution can be made uniform.

(Electrostatic Coating Gun)

Figure 5:
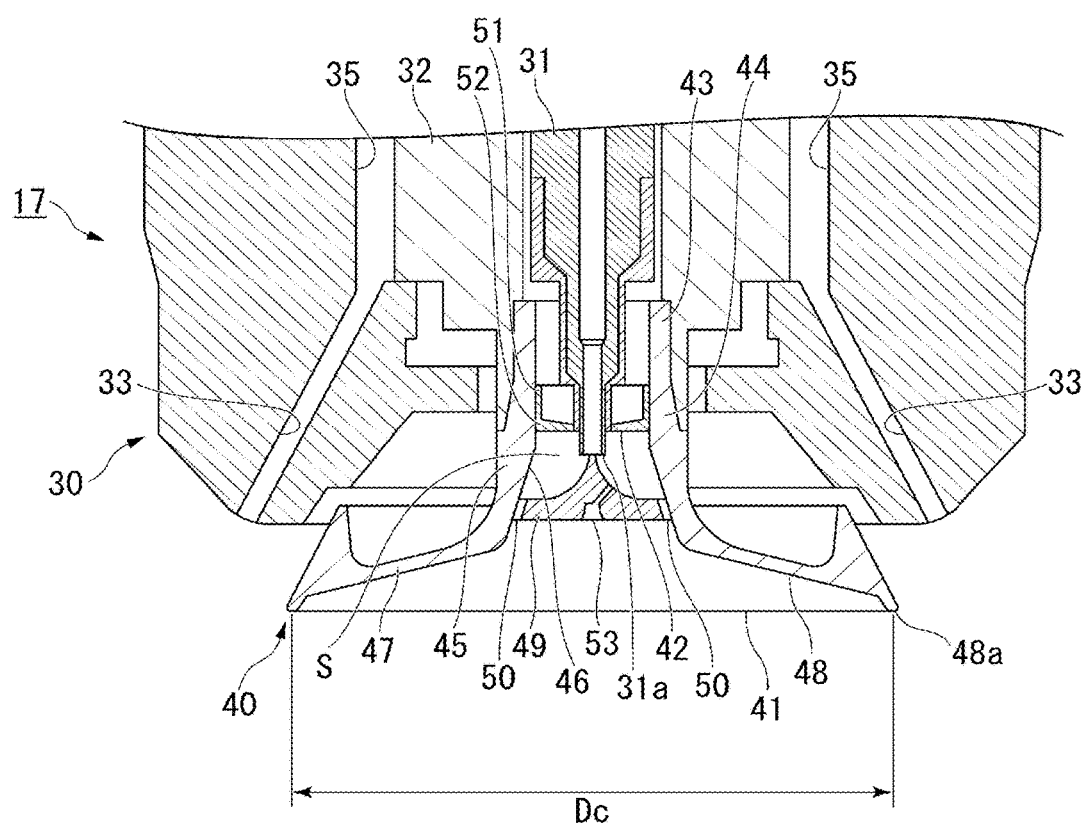
FIG. 5 is a cross-sectional view schematically illustrating an electrostatic coating gun 17 which the electrostatic coating apparatus in FIG. 4 has.
Figure 6:
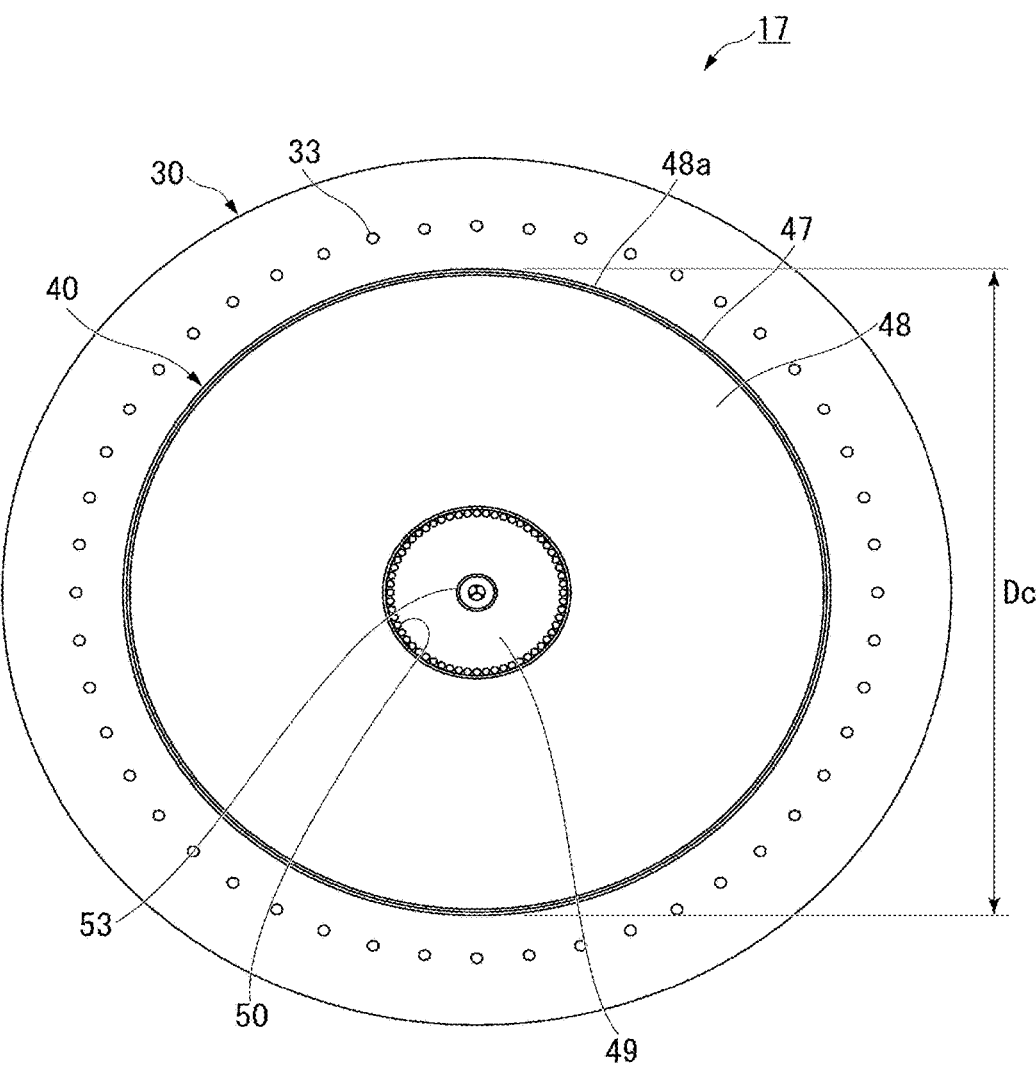
FIG. 6 is a front view schematically illustrating the electrostatic coating gun 17 in FIG. 5 as observed from the front.

FIG. 5 is a cross-sectional view schematically illustrating the electrostatic coating gun 17. FIG. 6 is a front view schematically illustrating the electrostatic coating gun 17 as observed from the front.

The electrostatic coating gun 17 comprises a gun main body 30 and a rotary atomizing head 40. The rotary atomizing head 40 is disposed at the front end of the gun main body 30 with its axis line in parallel with the front-back direction.

The electrostatic coating gun 17 has such a constitution that the coating composition supplied to the rotary atomizing head 40 is atomized and emitted (that is, sprayed) by centrifugal force by rotationally driving the rotary atomizing head 40.

In the description of the electrostatic coating gun 17, "front" in e.g. "from the front" or "the front end" means the direction of spray of the coating composition, and the opposite direction is the back side. The bottom side in FIGS. 5 and 6 corresponds to the front of the electrostatic coating gun 17.

In the gun main body 30, a coating composition supply tube 31 is accommodated as fixed on the same axis as the rotary atomizing head 40.

The gun main body 30 has an air turbine motor (not shown) therein, and the air turbine motor is provided with a rotating shaft 32. Further, with the air turbine motor, one system (for example, the supply line 16a) between the two-system air supply lines 16a and 16b is connected, so that the number of revolutions of the rotating shaft 32 can be controlled by the air pressure from the supply line 16a. The rotating shaft 32 is disposed so as to surround the coating material supply tube 31 on the same axis as the rotary atomizing head 40.

In this example, the air turbine motor is employed as a means to rotationally drive the rotating shaft 32, however, a rotary driving means other than the air turbine motor may be used.

The gun main body 30 has a plurality of shaving air (also called shaping air) outlets 33 formed, and each of the plurality of outlets 33 has an air supply path 35 to supply the shaving air. Further, with each air supply path 35, one system (for example, the supply line 16b) between the two-system air supply lines 16a and 16b is connected, so that the air (shaving air) can be supplied to the outlet 33 via the air supply path 35.

The plurality of outlets 33 are formed at regular intervals on a concentric circle centering on the shaft center, in the front view of the electrostatic coating gun 17. Further, the plurality of outlets 33 are formed so as to be gradually apart from the shaft center toward the front of the electrostatic coating gun 17, in the side view of the electrostatic coating gun 17.

The rotary atomizing head 40 comprises a first member 41 and a second member 42. The first member 41 and the second member 42 are tubular.

The first member 41 comprises a shaft attaching portion 43, a holding portion 44 extending from the shaft attaching portion 43 to the front, a peripheral wall 45 extending from the holding portion 44 to the front, an expanding portion 47 extending from the peripheral wall 45 to the front, and a front wall 49 compartmentalizing the center hole of the first member 41 into the back and the front at a boundary between the peripheral wall 45 and the expanding portion 47, integrally formed.

The holding portion 44 is to hold the second member 42 on the same axis as the first member 41.

The inner peripheral surface of the peripheral wall 45 forms a tapered guide plane 46 covering the entire region of the rotary atomizing head 40 in the axis direction, gradually expanding toward the front.

The expanding portion 47 expands in a cup-shape toward the front, and the front surface of the expanding portion 47 forms a diffusing surface 48 gradually expanding toward the front.

An outer peripheral edge 48a of the diffusing surface 48 of the expanding portion 47 has many fine cuts to form the coating composition into fine droplets provided substantially at regular intervals over the whole circumference.

The front wall 49 has emission holes 50 penetrating the peripheral edge of the front wall 49 in the front-back direction. The emission holes 50 are circular, and a plurality of the emission holes are formed at the regular angle pitch in the circumferential direction. Further, the penetrating direction of the emission holes 50 is in parallel with the direction of tilt of the guide plane 46 of the peripheral wall 45.

The center portion among the back surface of the front wall 49 is in a conical shape protruding backward. Further, at this center portion, a though-hole 53 extending from the center on the front surface of the front wall 49 toward the back, branching in three directions in the middle and opening on the peripheral surface of the conical portion, is formed.

The second member 42 comprises a tubular portion 51 and a back wall 52 integrally formed. The back wall 52 is disposed at the front end of the tubular portion 51. At the center of the back wall 52, a circular through-hole is formed, into which the front end of the coating composition supply tube 31 can be inserted.

In the rotary atomizing head 40, a space surrounded by the front wall 49, the peripheral wall 45 and the back wall 52 is considered as a storage room S. This storage room S communicates with the diffusing surface 48 via the plurality of emission holes 50.

In the electrostatic coating gun 17, the front end of the coating composition supply tube 31 is inserted into the through-hole at the center of the back wall 52 so that an exhaust port 31a on the front end of the coating composition supply tube 31 opens in the storage room S, whereby the coating composition can be supplied to the storage room S via the coating material supply tube 31.

The electrostatic coating apparatus and the electrostatic coating gun are not limited to ones shown in Fig. As the electrostatic coating apparatus, a known electrostatic coating apparatus may be employed so long as it is equipped with an electrostatic coating gun having a rotary atomizing head. As the electrostatic coating gun, a known electrostatic coating gun may be employed so long as it has a rotary atomizing head.

(Application Method)

In the electrostatic coating apparatus 10, the coating composition is applied to the translucent substrate 3 as follows.

The translucent substrate 3 is placed on the electrically conductive substrate 21. Further, a high voltage is applied to the electrostatic coating gun 17 by a high voltage generating apparatus 18. At the same time, the coating composition is supplied from the coating composition supply line 14 to the electrostatic coating gun 17, and the air is supplied respectively from the two-system air supply lines 16a and 16b to the electrostatic coating gun 17.

The air supplied from the air supply line 16b is supplied to the air supply path 35 in the gun main body 30 and is blown as the shaving air from the opening of the outlets 33.

The air supplied from the air supply line 16a drives the air turbine motor in the gun main body 30 and rotates the rotating shaft 32, whereby the coating composition supplied from the coating composition supply line 14 via the coating composition supply tube 31 to the storage room S moves forward along the guide plane 46 of the peripheral wall 45 by centrifugal force, passes through the emission holes 50 and is supplied to the diffusing surface 48. Part of the coating composition passes through the through-hole 58 at the center portion and is supplied to the diffusing surface 48. Here, since the guide plane 46 of the peripheral wall 45 is in a tapered shape extending toward the emission holes 50, the coating composition in the storage room S securely arrives at the emission holes 50 without remaining in the storage room S, by centrifugal force.

And, the coating composition supplied to the diffusing surface 48 moves toward the outer peripheral edge 48a side as being diffused along the diffusing surface 48 by centrifugal force, forms a liquid membrane of the coating composition on the diffusing surface 48, is formed into fine droplets at the outer peripheral edge 48a of the diffusing surface 48 of the expanding portion 47, which radially fly.

The droplets of the coating composition flying from the rotary atomizing head 40 are guided by the flow of the shaving air to the translucent substrate 3 direction. Further, the droplets are negatively charged and attracted to the grounded translucent substrate 3 by electrostatic attraction. Accordingly, they are efficiently attached to the surface of the translucent substrate 3.

Part of the coating composition which has not been sprayed from the electrostatic coating gun 17 is recovered in a coating composition tank (not shown) through the coating composition recovery line 15. Further, part of the coating composition which had been sprayed from the electrostatic coating gun 17 but has not been attached to the translucent substrate 3 is drawn into the exhaust box 20 and is recovered through the exhaust duck 19.

The surface temperature of the translucent substrate 3 is preferably at most 60° C., preferably from 15 to 50° C., more preferably from 20 to 40° C. When the surface temperature of the translucent substrate 3 is at least the lower limit of the above range, the liquid medium (B) in the coating composition will rapidly evaporate, whereby a sufficient concavo-convex structure tends to be formed. When the surface temperature of the translucent substrate 3 is at most the upper limit of the above range, the adhesion between the translucent substrate 3 and the antiglare film 5 will be favorable.

The preferred ranges of the temperature (application temperature) of the coating composition sprayed from the electrostatic coating gun 17 and the temperature in the coating booth 11 are also the same as above.

The rate of carriage of the translucent substrate 3 is preferably from 0.6 to 20.0 m/min, more preferably from 1.5 to 15.0 m/min. When the rate of carriage of the translucent substrate 3 is at least 0.6 m/min, the productivity will improve. When the rate of carriage of the translucent substrate 3 is at most 20.0 m/min, the thickness of the coating composition applied to the translucent substrate 3 is likely to be controlled.

The number of carriage of the translucent substrate 3, that is, the number of application of the coating composition to the translucent substrate 3 by making the translucent substrate 3 pass below the electrostatic coating gun 17, is properly set depending upon the desired haze, glossiness, etc. In view of the antiglare property, it is preferably at least 1, more preferably at least 2. In view of the productivity, it is preferably at most 10, more preferably at most 8.

The diameter Dc of the outer peripheral edge 48a of the rotary atomizing head 40 of the electrostatic coating gun 17 (the maximum diameter of the diffusing surface 48, hereinafter sometimes referred to as "cup diameter") is preferably at least 50 mm, more preferably from 55 to 90 mm, particularly preferably from 60 to 80 mm. When the cup diameter is at least the above lower limit, centrifugal force when the rotary atomizing head 40 rotates is large, the droplets of the coating composition flying from the rotary atomizing head 40 tends to be finer, and an antiglare film having a desired surface shape tends to be formed. When the cup diameter is at most the upper limit of the above range, the cup can stably be rotated.

The distance from the tip (that is, the front end of the rotary atomizing head 40 in the direction of spray of the coating composition) of the electrostatic coating gun 17 to the translucent substrate 3 (hereinafter sometimes referred to as nozzle height) is properly adjusted depending upon the width of the translucent substrate 3, the film thickness of the coating composition applied to the translucent substrate 3, etc. It is usually from 150 to 450 mm. When the distance to the translucent substrate 3 is short, the coating efficiency increases, however, if it is too short, discharge is likely to occur, such being problematic in view of the safety. On the other hand, as the distance to the translucent substrate 3 is longer, the coating region broadens, however, if it is too long, a problem of a decrease of the coating efficiency will arise.

The voltage applied to the electrostatic coating gun 17 is properly adjusted depending upon the amount of the coating composition applied to the translucent substrate 3, etc., and is usually within a range of from −30 kV to −90 kV. The higher the absolute value of the voltage is, the higher the coating efficiency tends to be. Here, the coating efficiency reaches saturation when the applied voltage reaches a certain extent, although it depends on the liquid properties, the application environment and the application conditions.

The amount of supply of the coating composition (hereinafter sometimes referred to as the coating liquid amount) to the electrostatic coating gun 17 is properly adjusted depending upon the amount of the coating composition applied to the translucent substrate 3, etc. It is preferably less than 70 mL/min, more preferably from 10 to 50 mL/min. When the coating liquid amount is at most the above upper limit, the droplets of the coating composition flying from the rotary atomizing head 40 tend to be finer, and an antiglare film having a desired surface shape is likely to be formed. When the coating liquid amount is at least the above lower limit, distribution of the in-plane haze tends to be small.

The pressure of the air supplied from each of the two-system air supply lines 16a and 16b to the electrostatic coating gun 17, is properly adjusted depending upon the amount of the coating composition applied to the translucent substrate 3, etc., and is usually from 0.01 MPa to 0.5 MPa.

By the air pressure supplied from each of the two-system air supply lines 16a and 16b to the electrostatic coating gun 17, the coating composition application pattern can be controlled.

The coating composition application pattern is a pattern formed by the droplets of the coating composition sprayed from the electrostatic coating gun 17 on the translucent substrate.

When the air pressure of the air supplied to the air turbine motor in the electrostatic coating gun 17 is increased, the rotational speed of the rotating shaft 32 increases, and the rotational speed of the rotary atomizing head 40 increases, whereby the droplets flying from the rotary atomizing head 40 tend to be small, and the application pattern tends to be large.

When the air pressure of the air supplied to the air supply path 35 in the electrostatic coating gun 17 is increased and the air pressure of the air (shaving air) blown from the outlets 33 is increased, the droplets flying from the rotary atomizing head 40 are prevented from spreading, and the application pattern tends to be small.

The air pressure of the air supplied to the air turbine motor is set depending upon the rotational speed of the rotary atomizing head 40 (hereinafter sometimes referred to as the number of revolutions of cup). The higher the air pressure is, the higher the number of revolutions of cup is.

The number of revolutions of cup is preferably at least 30,000 rpm, more preferably from 30,000 to 80,000 rpm, particularly preferably from 32,000 to 80,000 rpm. When the number of revolutions of cup is at least the lower limit of the above range, the droplets of the coating composition flying from the rotary atomizing head 40 tend to be finer, and an antiglare film having a desired surface shape is likely to be formed. When the number of revolutions of cup is at most the upper limit of the above range, an excellent coating efficiency will be obtained.

The number of revolutions of cup is measured by a measuring instrument (not shown) attached to the electrostatic coating apparatus 10.

The air pressure of the air supplied to the air supply path 35 is preferably such a pressure that the air pressure of the shaving air (hereinafter sometimes referred to as the shaving pressure) is within a range of from 0.01 to 0.3 MPa. The shaving pressure is more preferably from 0.01 to 0.25 MPa, particularly preferably from 0.01 to 0.2 MPa. When the shaving pressure is at least the lower limit of the above range, the coating efficiency will improve due to an improvement of the effect to suppress flying of the droplets. When the shaving pressure is at most the upper limit of the above range, the coating width can be secured.

[Baking Step]

In the baking step, the coating film of the coating composition formed on the translucent substrate in the application step is baked to obtain an antiglare film.

Baking may be carried out simultaneously with application by heating the translucent substrate when the coating composition is applied to the translucent substrate, or may be carried out by heating the coating film after the coating composition is applied to the translucent substrate.

The baking temperature is preferably at least 30° C., and for example, when the translucent substrate is glass, it is more preferably from 100 to 750° C., further preferably from 150 to 550° C.

By the above-described production process, the predetermined coating composition is sprayed by the electrostatic coating gun equipped with the rotary atomizing head to form an antiglare film 5 having a concavo-convex structure containing first convex portions 5a and second convex portions 5b on its surface. This is considered to be because the droplets of the coating composition are attached to the translucent substrate 3 at a moderate rate as compared with a conventionally employed spray method (particularly a method of using a two-fluid nozzle), and further, after the droplets are attached, the liquid medium (B) volatilizes quickly, whereby the droplets are less likely to spread on the translucent substrate 3, and a film is formed in a state where the shape when the droplets are attached is sufficiently maintained (that is, the entire liquid medium (B) is removed, and in a case where the silica precursor (A) is contained, the silica precursor (A) forms the matrix).

Further, in the production process, the surface shape of the antiglare film 5 to be formed can be controlled e.g. by the viscosity of the coating composition, the application conditions (such as the cup diameter, the coat liquid amount and the number of revolutions of cup) in the application step, and the temperature in the baking step. For example, the droplets formed when the coating composition is electrified and sprayed tend to be smaller, when the viscosity of the coating composition is lower, the cup diameter is larger, the coating liquid amount is smaller, or the number of revolutions of cup is larger. The smaller the droplets are, the more the number of the second convex portions 5b per 1 µm² tends to be.

{Second Embodiment}

Figure 7:
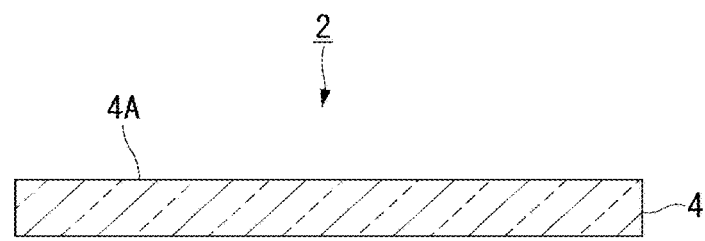
FIG. 7 is a cross-sectional view schematically illustrating a second embodiment of the translucent structure of the present invention.
Figure 8:
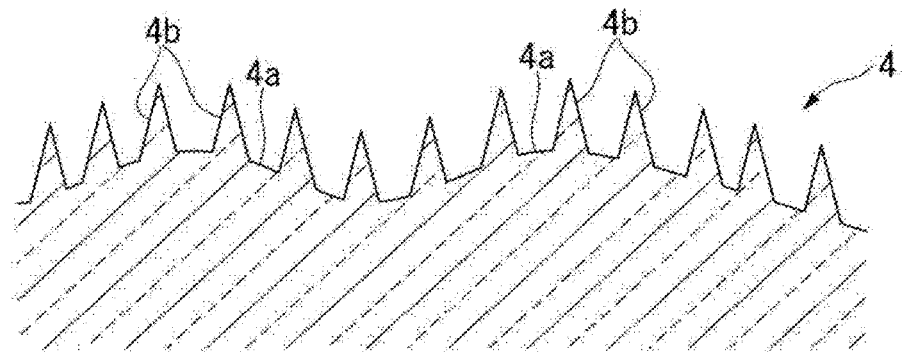
FIG. 8 is a cross-sectional view schematically illustrating the surface shape of the translucent structure according to the second embodiment.

FIG. 7 is a cross-sectional view schematically illustrating a second embodiment of the translucent structure of the present invention. FIG. 8 is a cross-sectional view schematically illustrating the surface shape of the translucent structure according to the present embodiment.

A translucent structure 2 according to the present embodiment comprises a translucent substrate 4. The translucent substrate 4 has a concavo-convex structure on a first surface 4a, and the concavo-convex structure has first convex portions 4a and second convex portions 4b.

The first surface 4A of the translucent substrate 4 constitutes the surface of the translucent structure 2. Accordingly, the translucent structure 2 has the concavo-convex structure on its surface.

The translucent substrate 4 is the same as the translucent substrate 3 according to the first embodiment except that it has the concavo-convex structure on the first surface, and the preferred embodiment is also the same.

Further, the concavo-convex structure on the surface of the translucent substrate 4 is the same as the concavo-convex structure on the surface of the antiglare film 5 according to the first embodiment, and the preferred embodiment is also the same.

The 60° specular glossiness on the surface having the concavo-convex structure of the translucent substrate 4 is preferably at most 90%, more preferably at most 70%, further preferably at most 50%. When the 60° specular glossiness is at most the above upper limit, a sufficient antiglare effect will be obtained.

The haze of the translucent structure 2 is preferably higher than 10% and at most 70%, more preferably higher than 10% and at most 60%, particularly preferably higher than 10% and at most 50%. When the haze is at least the lower limit of the above range, more excellent antiglare property will be obtained.

<Advantageous Effects>

The translucent structure 2, which has a concavo-convex structure containing first convex portions 4a and second convex portions 4b with a number of the second convex portions 4b of from 0.0004 to 1.2 per 1 µm² on its surface, is excellent in the antiglare property and has its sparkle sufficiently suppressed, in the same manner as the above-described translucent structure 1.

<Process for Producing Translucent Structure>

As a process for producing the translucent structure 2, for example, a process of forming the concavo-convex structure by subjecting the surface of a translucent substrate which does not have the above concavo-convex structure to etching treatment at least twice under different treatment conditions.

For example, the concavo-convex structure is formed by forming the first convex portions by the first etching treatment and forming the second convex portions by the second etching treatment.

The etching treatment may be carried out by known etching method depending upon the material of the translucent substrate, the haze requires, etc. The etching rate of the second etching treatment is preferably higher than the etching rate of the first etching treatment.

Further, an antiglare film may be formed on the translucent substrate subjected to the etching treatment, or a translucent substrate having an antiglare film formed thereon may be subjected to etching. For example, the concavo-convex structure is formed by forming the first convex portions by subjecting the translucent substrate to etching treatment and then forming the second convex portions by applying the coating composition.

For example, as the etching method in a case where the translucent substrate is a glass substrate, a method of bringing a fluorinating agent into contact with the surface of the glass substrate may be mentioned. By bringing a fluorinating agent into contact, on the glass surface, the fluorinating agent reacts with $SiO_2$ as a glass matrix structure to form $SiF_4$ (gas), and the remaining components after the matrix is lost form a silicofluoride to make the glass surface have irregularities. The fluorinating agent may, for example, be fluorine single substance ($F_2$) or hydrogen fluoride (HF). By this method, the shape of the irregularities formed may be adjusted by the type of the fluorinating agent, the time over which the fluorinating agent is brought into contact with the glass surface, the etching temperature, etc.

As an etching method on the glass substrate other than the method of bringing the fluorinating agent into contact, or an etching method applicable also to a translucent substrate other than the glass substrate, for example, blasting or ion etching treatment may be mentioned.

{Third Embodiment}

Figure 9:
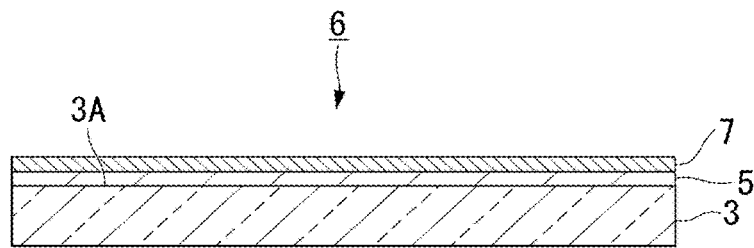
FIG. 9 is a cross-sectional view schematically illustrating a third embodiment of the translucent structure of the present invention.
Figure 10:
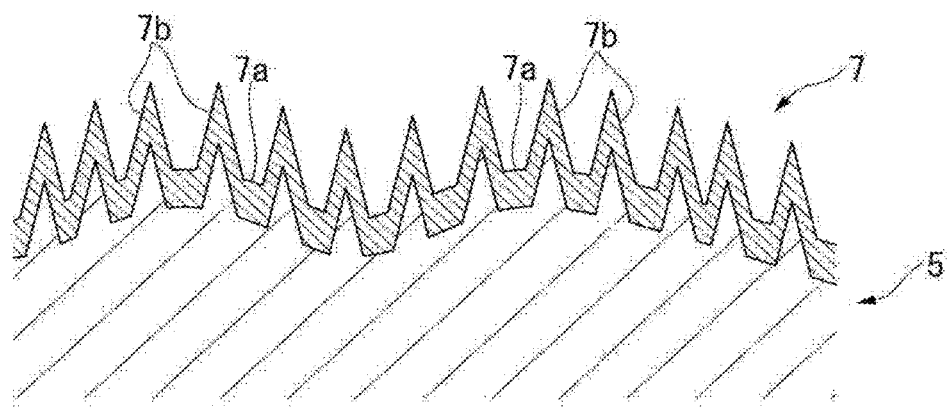
FIG. 10 is a cross-sectional view schematically illustrating the surface shape of the translucent structure according to the third embodiment.

FIG. 9 is a cross-sectional view schematically illustrating a third embodiment of the translucent structure of the present invention. FIG. 10 is a cross-sectional view schematically illustrating the surface shape of the translucent structure according to the present embodiment. In the following description, constituents corresponding to those in the already described embodiments are represented by the same symbols and their detailed description is omitted.

A translucent structure 6 according to the present embodiment comprises a translucent substrate 3, an antiglare film 5 formed on a first surface 3A of the translucent substrate 3, and a water/oil repellent layer 7 formed on the antiglare film 5.

The water/oil repellent layer 7 has a concavo-convex structure on its surface, and the concavo-convex structure contains first convex portions 7a and second convex portions 7b.

The surface of the water/oil repellent layer 7 constitutes the surface of the translucent structure 6. Accordingly, the translucent structure 6 has the concavo-convex structure on its surface.

The concavo-convex structure on the surface of the water/oil repellent layer 7 is the same as the concavo-convex structure on the surface of the antiglare film 5 according to the first embodiment, and the preferred embodiment is also the same.

The concavo-convex structure on the surface of the antiglare film 5 and the concavo-convex structure on the surface of the water/oil repellent layer 7 may be the same or different from each other so long as the above requirements are met. For example, they may differ in at least one of the average diameter (as calculated as an exact circle) and the maximum height of the first convex portions 5a and 7a, and the average height and the number per 1 µm² of the second convex portions 5b and 7b.

The irregularities on the surface of the water/oil repellent layer 7 preferably conform to the irregularities on the surface of the antiglare film 5, as shown in FIG. 9. In such a case, the concavo-convex structure on the surface of the water/oil repellent layer 7 may have a reduced acuteness or difference in height as compared with the concavo-convex structure on the surface of the antiglare film 5. For example, the average height of the second convex portions 7b may be lower than the average height of the second convex portions 5b.

The water/oil repellent layer 7 is a layer having water/oil repellency. "Having water/oil repellency" means a water contact angle being at least 90° and an oleic acid contact angle being at least 70°.

The contact angle is measured with respect to a 1 μL droplet by a contact angle meter (for example, DM-701 manufactured by Kyowa Interface Sciences Co., Ltd.) under conditions of 20±10° C. Measurement is conducted on 5 different points on the water/oil repellent layer surface, and their average is calculated and is taken as the contact angle of the water/oil repellent layer.

The water/oil repellent layer 7 may, for example, be a layer containing a water/oil repellent.

The water/oil repellent may, for example, be a perfluoroalkyl group-containing compound or a perfluoropolyether group-containing compound.

The thickness of the water/oil repellent layer 7 is preferably from 2 to 30 nm, more preferably from 5 to 20 nm. When the thickness of the water/oil repellent layer 7 is at least the lower limit of the above range, sufficient water/oil repellency will be obtained, and the finger-sliding property on the surface of the water/oil repellent layer 7 tends to be good. When the thickness of the water/oil repellent layer 7 is at least the lower limit of the above range, surface non-uniformity and the like are less likely to occur, and a favorable outer appearance will be obtained.

The thickness of the water/oil repellent layer 7 is obtained in such a manner that an antireflection film of which the reflectance spectrum was preliminarily measured is prepared, a water/oil repellent layer is formed on the antireflection film under the same conditions as the sample for measurement of the thickness of the water/oil repellent layer 7, and the thickness of the water/oil repellent layer 7 is calculated from the reflectance spectrum after the water/oil repellent layer is formed and the refractive index of the water/oil repellent.

The 60° specular glossiness on the surface of the water/oil repellent layer 7 is preferably at most 90%, more preferably at most 70%, further preferably at most 50%. When the 60° specular glossiness is at most the above upper limit, a sufficient antiglare effect will be obtained.

The haze of the translucent structure 6 is preferably higher than 10% and at most 70%, more preferably higher than 10% and at most 60%, particularly preferably higher than 10% and at most 50%. When the haze is at least the lower limit of the above range, more excellent antiglare property will be obtained.

<Advantageous Effect>

The translucent structure 6, which has a concavo-convex structure containing first convex portions 7a and second convex portions 7b with a number of the second convex portions 7b of from 0.0004 to 1.2 per 1 μm² on its surface, is excellent in the antiglare property and has its sparkle sufficiently suppressed, in the same manner as the above-described translucent structure 1.

Further, since it has the water/oil repellent layer 7 disposed as the outermost layer, the finger sliding property is favorable. The favorable finger sliding property is advantageous, for example, in view of operation of a touch panel.

<Process for Producing Translucent Structure>

The translucent structure 6 is produced, for example, by forming the antiglare film 5 on the first surface 3a of the translucent substrate 3 by the production process mentioned in the first embodiment, and treating the surface of the antiglare film 5 with a water/oil repellent to form the water/oil repellent layer 7.

By treating the surface of the antiglare film 5 with a water/oil repellent, the water/oil repellent layer 7 is formed along the surface of the antiglare film 5. Accordingly, the surface of the water/oil repellent layer 7 has a concavo-convex structure having a shape similar to the concavo-convex structure on the surface of the antiglare film 5, although the shape may slightly change.

As the treatment method with a water/oil repellent, a deposition method, a spray coating method, a dip coating method, a squeegee coating method, a wipe coating method or a flow coating method may, for example, be mentioned. Heat treatment may be conducted after film forming. As the heat treatment conditions, for example, heat treatment in the air at 90° C. for one hour may, for example, be mentioned.

{Fourth Embodiment}

Figure 11:
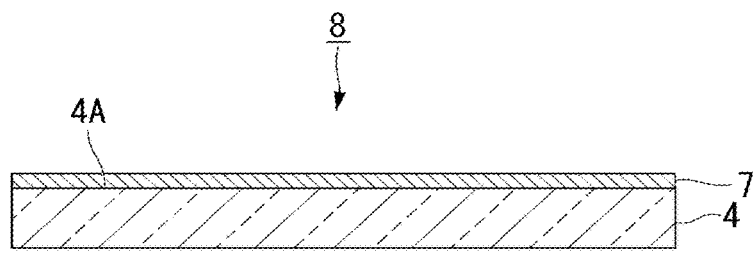
FIG. 11 is a cross-sectional view schematically illustrating a fourth embodiment of the translucent structure of the present invention.
Figure 12:
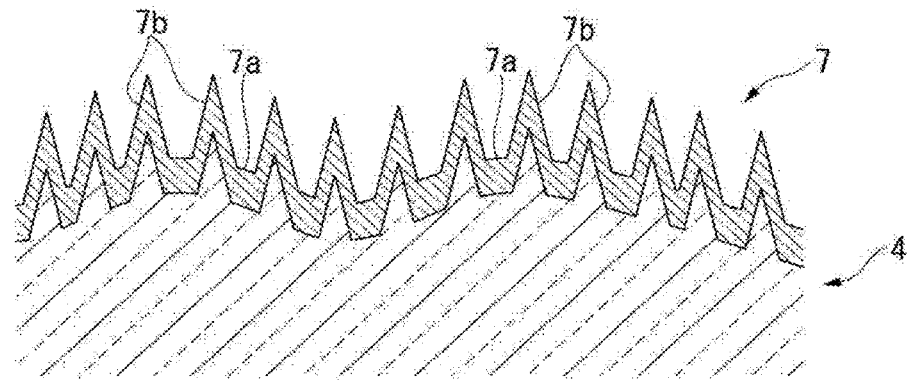
FIG. 12 is a cross-sectional view schematically illustrating the surface shape of the translucent structure according to the fourth embodiment.

FIG. 11 is a cross-sectional view schematically illustrating a fourth embodiment of the translucent structure of the present invention. FIG. 12 is a cross-sectional view schematically illustrating the surface shape of the translucent structure according to the present embodiment.

A translucent structure 8 according to the present embodiment comprises a translucent substrate 4, and a water/oil repellent layer 7 formed on a first surface 4A of the translucent substrate 4.

The water/oil repellent layer 7 has a concavo-convex structure on its surface, and the concavo-convex structure contains first convex portions 7a and second convex portions 7b.

The surface of the water/oil repellent layer 7 constitutes the surface of the translucent structure 8. Accordingly, the translucent structure 8 has the above concavo-convex structure on its surface.

In the translucent structure 8, the concavo-convex structure on the first surface 4A of the translucent substrate 4 and the concavo-convex structure on the surface of the water/oil repellent layer 7 may be the same or different. For example, they may differ in at least one of the average diameter (as calculated as an exact circle) and the maximum height of the first convex portions 4a and 7a, and the average height and the number per 1 μm² of the second convex portions 4a and 7a.

The irregularities on the surface of the water/oil repellent layer 7 preferably conform to the irregularities on the first surface 4A of the translucent substrate 4 as shown in FIG. 12. In such a case, the concavo-convex structure on the surface of the water/oil repellent layer 7 may have a reduced acuteness or difference in height as compared with the concavo-convex structure on the first surface 4A of the translucent substrate 4. For example, the average height of the second convex portions 7b may be lower than the average height of the second convex portions 4b.

The 60° specular glossiness on the first surface 4A of the translucent substrate 4 is preferably at most 90%, more preferably at most 70%, further preferably at most 50%. When the 60° specular glossiness is at most the above upper limit, a sufficient antiglare effect will be obtained.

The haze of the translucent structure 8 is preferably higher than 10% and at most 70%, more preferably higher than 10% and at most 60%, particularly preferably higher than 10% and at most 50%. When the haze is at least the lower limit of the above range, a more excellent antiglare property will be obtained.

<Advantageous Effect>

The translucent structure 8, which has a concavo-convex structure containing first convex portions 7a and second convex portions 7b with a number of the second convex portions 7b of from 0.0004 to 1.2 per 1 μm² on its surface, is excellent in the antiglare property and has its sparkle sufficiently suppressed, in the same manner as the above-described translucent structure 6. Further, since it has the water/oil repellent layer 7 disposed as the outermost layer, the finger sliding property is favorable.

<Process for Producing Translucent Structure>

The translucent structure 8 may be produced, for example, by producing a translucent substrate 4 by the production process described in the second embodiment, and treatment the first surface 4A of the translucent substrate 4 with a water/oil repellent to form the water/oil repellent layer 7.

As the treatment method with a water/oil repellent, the method described in the third embodiment may be mentioned.

The translucent structure of the present invention has been described with reference to the first to fourth embodiments, however, the present invention is by no means restricted to such embodiments. The respective constituents, their combinations, etc. in the above embodiments are merely examples, and without departing from the intension and the scope of the present invention, addition, omission, replacement, and other changes of the constituents are possible.

For example, the first and third embodiments are examples in which the antiglare film 5 is formed only on one surface (first surface 3A) of the translucent substrate 3, however, the antiglare film 5 may be formed on both surfaces of the translucent substrate 3. Further, the antiglare film 5 may be provided entirely or partially on one of or both surfaces of the translucent substrate 3.

The second and fourth embodiments are examples in which the concavo-convex structure is provided only on one surface (first surface 4A) of the translucent substrate 4, however, the concavo-convex structure may be provided on both surfaces of the translucent substrate 4. Further, the concavo-convex structure may be provided entirely or partially on one of or both surfaces of the translucent substrate 4.

{Application}

The application of the translucent structure of the present invention is not particularly limited. As specific examples, a transparent member for vehicles (for example, a headlight cover, a side mirror, a front transparent substrate, a side transparent substrate, a rear transparent substrate or an instrument panel surface), a meter, a building window, a show window, a display (for example, a notebook personal computer, a monitor, a LCD, a PDP, an ELD, a CRT or a PDA), an LCD color filter, a substrate for a touch panel, a pickup lens, a spectacle lens, a camera member, a video member, a cover substrate for a CCD, an optical fiber edge surface, a member for a projector, a member for a copying machine, a transparent substrate for a solar cell (for example, a cover glass), a cell phone window, a backlight unit member (for example, a light guide plate or a cold-cathode tube), a film for improving the brightness of a backlight unit member liquid crystal (for example, a prism or a semi-transmissive film), a liquid crystal brightness-improving film, an organic EL light emitting element member, an inorganic EL light emitting element member, fluorescent light emitting element member, an optical filter, an edge surface of an optical member, an illumination lamp, a cover of lighting equipment, an amplifying laser light source, an antireflection film, a polarizing film, an agricultural film, etc. may be mentioned.

As the application of the translucent structure of the present invention, with a view to satisfying both antiglare property and low sparkle at high levels, an interior article of a transport vehicle is preferred, and an on-vehicle article is more preferred. As the on-vehicle particle, preferred is an on-vehicle system provided with an image display device (for example, a car navigation system, an instrument panel, a headup display, a dashboard, a center console or a shift knob).

<<Article>>

The article of the present invention comprises the above translucent structure.

The article of the present invention may be composed of the translucent structure or may further have another member other than the translucent structure.

The article of the present invention may, for example, be the above mentioned as the application of the translucent structure, or an apparatus provided with at least one of them.

The apparatus may, for example, be an image display device or a system equipped therewith, a lighting equipment or a system equipped therewith, or a solar cell module.

The article of the present invention is preferably an image display device or a system equipped therewith, in view of the optical properties such as the haze, the glossiness and the antiglare property.

In a case where the article of the present invention is an image display device, the image display device comprises an image display device main body to display an image, and the translucent structure of the present invention provided on the viewer's side of the image display device main body.

The image display device main body may, for example, be a liquid crystal panel, an organic EL (electroluminescence) panel or a plasma display panel.

The translucent structure may be provided on the image display device main body integrally as a protective plate for the image display device main body, or may be disposed on the viewer's side of the image display device main body as a filter.

The above-described image display device or system equipped therewith, which has the translucent structure of the present invention on the viewer's side of the image display main body, provides favorable visibility.

EXAMPLES

Now, the present invention will be described in further detail with reference to Examples. However, it should be understood that the present invention is not limited to the following description.

Among the after-described Ex. 1 to 12, Ex. 1 to 8 and 13 to 17 are Examples of the present invention, and Ex. 9 to 12 are Comparative Examples.

The evaluation methods and materials employed in Ex. are mentioned below.

<Evaluation Methods>

(Measurement of Liquid Viscosity)

Measured by using a type B viscometer manufactured by EKO Instruments.

(Method for Measuring Refractive Index)

A flat film having a thickness of 100 nm was formed on a FL 1.1 mm glass substrate manufactured by Asahi Glass Company, Limited using a coating liquid by a spin coating method, and the glass substrate having the film formed thereon was baked in the air at 450° C. for 30 minutes. With respect to the baked glass substrate and a glass substrate alone, the refractive index was measured by a spectrum ellipsometry M-2000DI manufactured by J. A. Woollam Co., Inc., and the refractive index of the film was calculated by fitting.

(Surface Shape Measurement)

The surface shape of the outermost surface (the surface on the antiglare film side or the surface on the water/oil repellent layer side) of the translucent structure was measured by a laser microscope VK-X100 manufactured by KEYENCE CORPORATION (as the object lens, one with a magnification of ×100 was used; the observation region: 107×143 µm or 109×145 µm, magnification: 1,000).

The reason why two different observation regions are described is that the observation region varies depending upon the individual difference of an object lens even when an object lens with the same ×100 magnification is used. Since the measurement results are represented by the maximum, minimum and average values in the observation region, there is substantially no difference in the results when an object lens with a magnification of ×100 is selected, even if the observation region is slightly different. The measurement mode was "surface shape", the measurement quality was "standard (1,024×768)", and the pitch was "0.08 µm".

(Surface Shape Analysis)

The xyz data on the surface shape obtained by the surface shape measurement were analyzed by an image processing software SPIP (version 5.1.11) manufactured by Image Metorology, and the following items were calculated.

The maximum height of the first convex portions (P to V), the average diameter of the first convex portions (the average of the diameters (as calculated as an exact circle) of the cut surfaces of the convex portions with a diameter (as calculated as an exact circle) of larger than 10 µm among the cut surfaces of the convex portions present in a cross section at a height of 0.05 µm+the bearing height), the average diameter of the second convex portions (the average of the diameters (as calculated as an exact circle) of the cut surfaces of the convex portions with a diameter (as calculated as an exact circle) of from 1 to 10 µm among the cut surfaces of the convex portions present in a cross section at a height of 0.5 µm+the bearing height), the maximum diameter and the minimum diameter of the second convex portions (the diameter (as calculated as an exact circle) of the cut surface of the largest convex portion and the diameter (as calculated as an exact circle) of the cut surface of the smallest convex portion among the cut surfaces of the convex portions with a diameter (as calculated as an exact circle) of from 1 to 10 µm present in a cross section at a height of 0.5 µm+the bearing height), the number of the second convex portions in the observation region (a region of 107×143 µm or 109×145 µm) (the number of the cut surfaces of the convex portions with a diameter (as calculated as an exact circle) of larger than 1 µm present in a cross section at a height of 0.5 µm+the bearing height), the density of the second convex portions (the number of the second convex portions in the observation region per 1 µm$^2$), the average height of the second convex portions (the average of the heights of the second convex portions present in the measured region based on the bearing height).

More specifically, the respective items were calculated by the following procedure.

For calculation of the maximum height of the first convex portions (P to V), in the gradient correction, mode: "custom", entire plane correction: "multinominal fitting", order: "3", Z-offset method: "Set minimum value to Zero" were selected, the detection method was "particles detection", for shape formation, "Preserve Holes in Shapes" option was switched off, "Contour smoothing" option was selected, and "Filter size" was set at 51 points. In filtering, "Border Mode" was selected, the minimum diameter was set to 10.0 µm, and while the threshold level was increased, the threshold level at which the shape with a diameter of at least 10 µm was not detected was taken as the maximum height of the first convex portions (P to V).

For calculation of the average diameter of the first convex portions, in the gradient correction, mode: "quality priority", entire plane correction: "multinominal fitting", order: "3", Z-offset method: "Set Bearing Height to Zero" were selected, the detection method was "particles detection", for shape formation, "Preserve Holes in Shapes" option was switched off, "Contour smoothing" option was selected, and "Filter Size" was set at 51 points. The threshold level was set to 0.05 µm, and in filtering, "Border Mode" was selected, and the minimum diameter was set to 10.0 µm.

For calculation of the average diameter of the second convex portions, the maximum diameter and the minimum diameter of the second convex portions, the number of the second convex portions in the observation region and the average height of the second convex portions, in the gradient correction, mode: "quality priority", entire plane correction: "multinominal fitting", order: "3", Z-offset method: "Set Bearing Height to Zero" were selected, the detection method was "particles detection", and for shape formation, "Preserve Holes in Shapes" option was switched off, "Contour smoothing" option was selected, and "Filter size" was set at 51 points. The threshold level was set to 0.05 µm, and in filtering, "Border Mode" option was switched off, and the minimum diameter was set to 1.0 µm.

(Sparkle Measurement)

With respect to the translucent structure, the sparkle index S was measured by EyeScale ISC-A manufactured by I System Corporation.

Based on the sparkle index S, sparkle was evaluated based on the following standards.

x: Sparkle index S≥100 (remarkable sparkle observed)

◯: Sparkle index 80≤S≤100 (sparkle observed but at a practically negligible level).

◉: Sparkle index 60≤S≤80 (sparkle slightly observed)

◉◉: Sparkle index S<60 (no sparkle observed at all)

(Haze Measurement)

The haze of the translucent structure was measured in accordance with the method in JIS K7136: 2000 using a haze meter (HR-100 manufactured by MURAKAMI COLOR RESEARCH LABORATORY).

(60° Specular Glossiness)

The 60° specular glossiness was measured as the glossiness on the surface of the antiglare film of the translucent structure. The 60° specular glossiness was measured by the method in JIS Z8741: 1997, 60° specular glossiness, by a gloss meter (MULTI GLOSS 268Plus manufactured by KONICA MINOLTA INC.), substantially at the center portion of the antiglare film, without eliminating the back reflection of the translucent structure.

Preparation of Base Liquid (A):

Modified ethanol (manufactured by Japan Alcohol Trading Co., Ltd SOLMIX (registered trademark) AP-11, a mixed solvent containing ethanol as the main component) as the liquid medium (B), silicate 40 (manufactured by Tama Chemicals, Co., Ltd., a mixture of tetraethoxysilane and its hydrolytic condensate) as the silica precursor (A) and a dispersion of scaly silica particles (one prepared by the method disclosed in Japanese Patent No. 4063464, viscosity at 25° C.: 0.1 Pa·s) as the particles (C) were mixed and stirred for 30 minutes. To the mixture, a mixed liquid of deionized water and an aqueous nitric acid solution (nitric acid concentration: 61 mass %) was added, followed by stirring for 60 minutes to prepare a base liquid (A).

Preparation of Silane Compound Solution (B):

To the above modified ethanol, a mixed liquid of deionized water and an aqueous nitric acid solution (nitric acid concentration: 61 mass %) was added, followed by stirring for 5 minutes. 1,6-Bis(trimethoxysilyl)hexane (manufactured by Shin-Etsu Chemical Co., Ltd., KBM-3066) as the silica precursor (A) was added, followed by stirring in a water bath at 60° C. for 15 minutes to prepare a silane compound solution (B).

(Preparation of Coating Liquid (C))

The above base liquid (A) and the above silane compound solution (B) were mixed to prepare a coating liquid (C).

(Preparation of Coating Liquid (D))

A coating liquid (D) was prepared in the same manner as the preparation of the coating liquid (C) except that the dispersion of scaly silica particles used for preparation of the base liquid (A) was changed (one prepared by the method disclosed in Japanese Patent No. 4063464, viscosity at 25° C.: 0.15 Pa·s).

(Preparation of Coating Liquid (E))

A coating liquid (E) was prepared in the same manner as the preparation of the coating liquid (C) except that silicate 40 used for preparation of the base liquid (A) was changed to methyltrimethoxysilane.

(Preparation of Coating Liquid (F))

A coating liquid (F) was prepared in the same manner as the preparation of the coating liquid (C) except that silicate 40 used for preparation of the base liquid (A) was changed to vinyltrimethoxysilane.

Ex. 1

(Washing of Translucent Substrate)

As the translucent substrate, soda lime glass (manufactured by Asahi Glass Company, Limited, FL1.1, a glass substrate having a size of 100 mm×100 mm and a thickness of 1.1 mm, average transmittance with respect to light in a wavelength region of from 400 to 1,100 nm: 90.6%, arithmetic mean roughness Ra of the surface: 0.5 nm) was prepared. The surface of the glass was washed with an aqueous sodium bicarbonate solution, rinsed with water and dried.

(Electrostatic Coating Apparatus)

An electrostatic coating apparatus (liquid electrostatic coater, manufactured by ASAHI SUNAC CORPORATION) having the same constitution as the electrostatic coating apparatus 10 shown in FIG. 4 was prepared. As the electrostatic coating gun, a rotary atomizing electrostatic automatic coating gun (manufactured by ASAHI SUNAC CORPORATION, Sun Bell ESA120, cup diameter: 70 mm) was prepared.

As the electrically conductive substrate, a metal mesh tray was prepared so that the translucent substrate would be more easily grounded.

(Electrostatic Coating)

The temperature in the coating booth of the electrostatic coating apparatus was set to be within a range of 25±1° C. and the humidity was set to be within a range of 50%±10%.

On a chain conveyor of the electrostatic coating apparatus, a washed translucent substrate preliminarily heated to 30° C.±3° C. was placed via the electrically conductive substrate. While the translucent substrate was carried at the constant speed by the chain conveyor, the coating liquid (C) at a temperature within a range of 25±1° C. was applied to the top surface (the opposite side from the surface which was in contact with molten tin at the time of production by float process) of the translucent substrate by an electrostatic coating method under application conditions (the coating liquid amount, the number of revolutions of cup, the nozzle height, the cup diameter, the voltage and the number of application) as identified in Table 1, and baked in the air at 450° C. for 30 minutes to prepare an antiglare film thereby to obtain a translucent structure.

With respect to the obtained translucent structure, the above evaluations were conducted. The results are shown in Table 2.

Here, the refractive index can be adjusted to be from 1.40 to 1.46 e.g. by changing the baking conditions or by changing the coating liquid preparation conditions, and it was 1.45 in all of Ex. 1 to 17.

Ex. 2 to 16

Translucent structures in Ex. 2 to 16 were prepared in the same manner as in Ex. 1 except that the coating liquid as identified in Table 1 was applied under the application conditions as identified in Table 1.

With respect to the obtained translucent structures, the above evaluations were conducted. The results are shown in Table 2.

Ex. 17

An antiglare film was formed on the translucent substrate in the same manner as in Ex. 1 except that the coating liquid as identified in Table 1 was applied under the application conditions as identified in Table 1.

Then, on the antiglare film, a fluorinated water/oil repellent (manufactured by Asahi Glass Company, Limited, tradename "Afluid (registered trademark) S-550") was applied by a spray coating apparatus to form a water/oil repellent layer having a thickness of about 7 nm to obtain a translucent structure in Ex. 17. Of the water/oil repellent layer having a thickness of about 7 nm formed by applying S-550 to glass by a spray coating apparatus, the water contact angle was 115°, and the oleic acid contact angle was 75°.

With respect to the obtained translucent structure, the above evaluations were conducted. The results are shown in Table.

Figure 13:
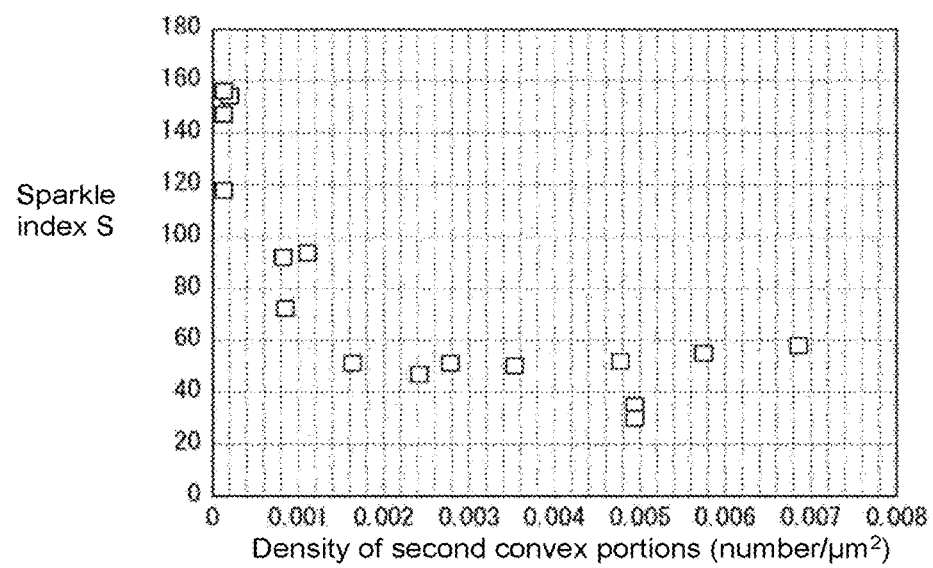
FIG. 13 is a graph illustrating the relation between the density of second convex portions (the number of the convex portions/μm$^2$) and the sparkle index S in Ex. 1 to 16 in Examples.
Figure 14:
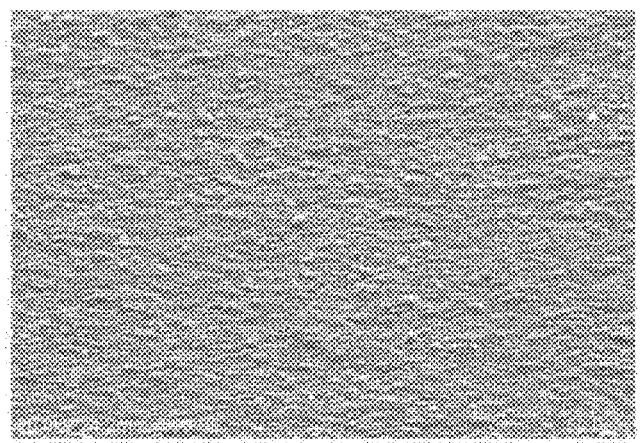
FIG. 14 is a scanning electron microscope (SEM) image of the surface of the antiglare film side of the translucent structure obtained in Ex. 1 in Examples as observed from an obliquely upward 60° direction.
Figure 15:
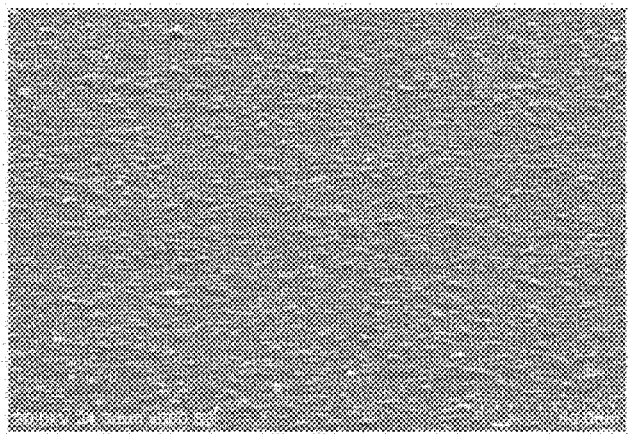
FIG. 15 is a scanning electron microscope (SEM) image of the surface of the antiglare film side of the translucent structure obtained in Ex. 3 in Examples as observed from an obliquely upward 60° direction.
Figure 16:
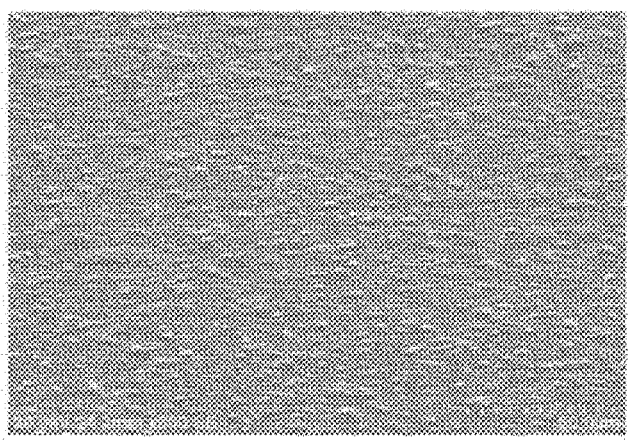
FIG. 16 is a scanning electron microscope (SEM) image of the surface of the antiglare film side of the translucent structure obtained in Ex. 6 in Examples as observed from an obliquely upward 60° direction.
Figure 17:
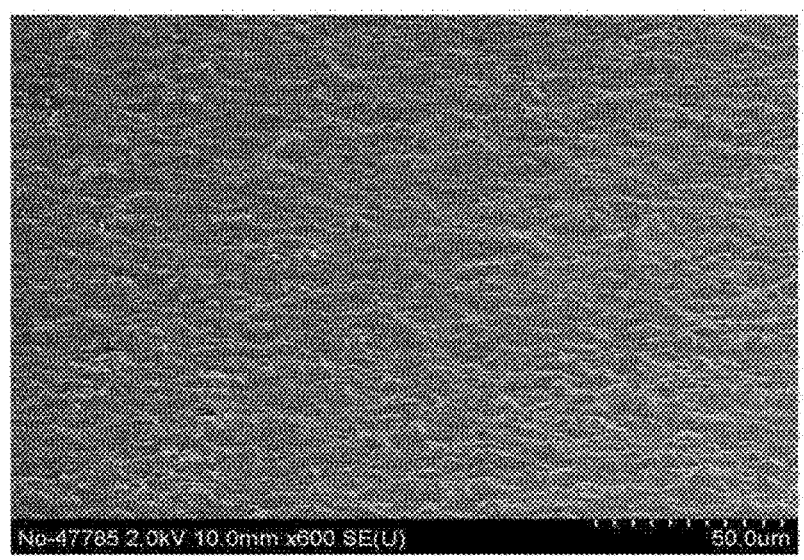
FIG. 17 is a scanning electron microscope (SEM) image of the surface of the antiglare film side of the translucent structure obtained in Ex. 13 in Examples as observed from an obliquely upward 60° direction.
Figure 18:
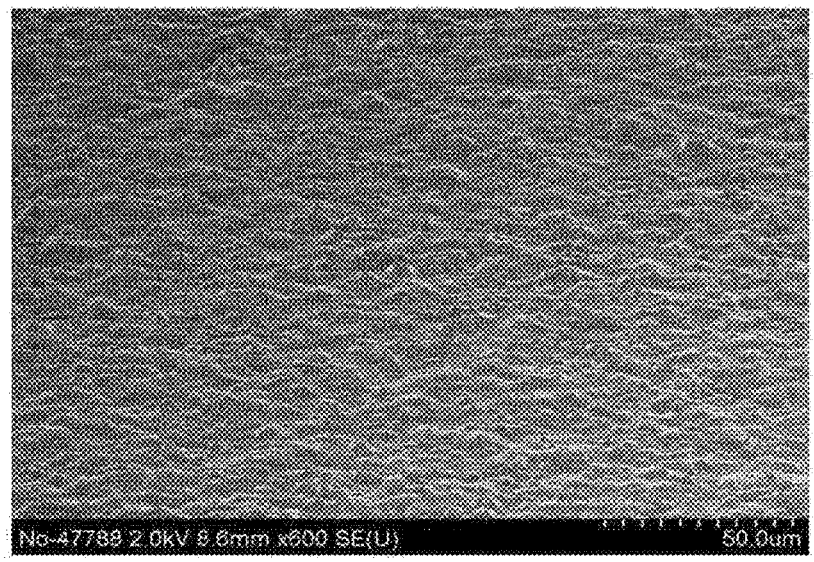
FIG. 18 is a scanning electron microscope (SEM) image of the surface of the antiglare film side of the translucent structure obtained in Ex. 14 in Examples as observed from an obliquely upward 60° direction.
Figure 19:
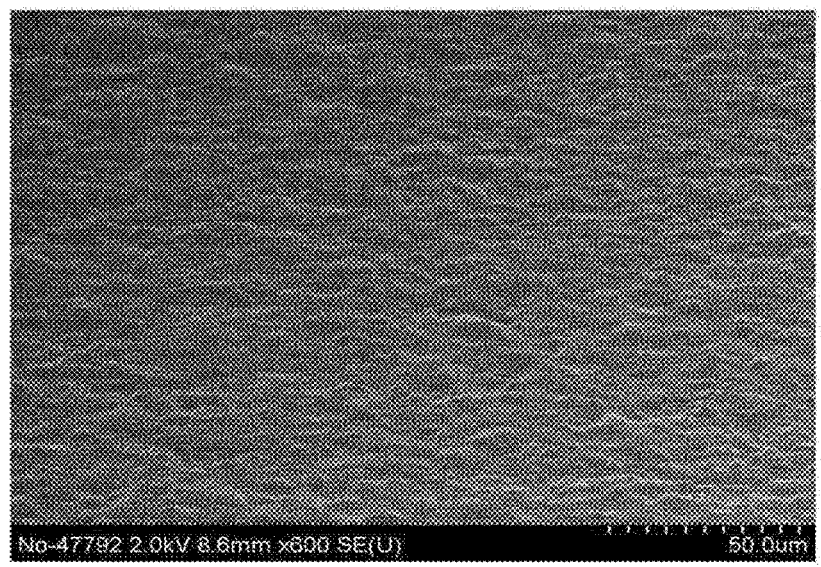
FIG. 19 is a scanning electron microscope (SEM) image of the surface of the antiglare film side of the translucent structure obtained in Ex. 15 in Examples as observed from an obliquely upward 60° direction.
Figure 20:
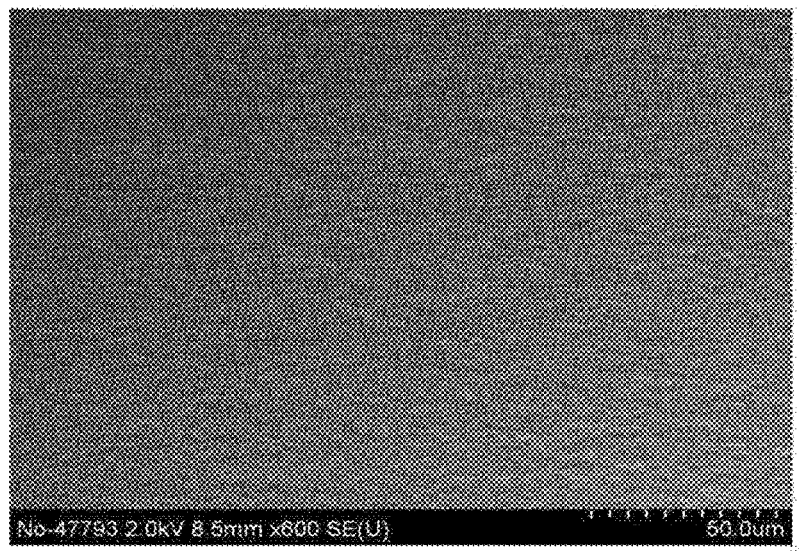
FIG. 20 is a scanning electron microscope (SEM) image of the surface of the antiglare film side of the translucent structure obtained in Ex. 16 in Examples as observed from an obliquely upward 60° direction.
Figure 21:
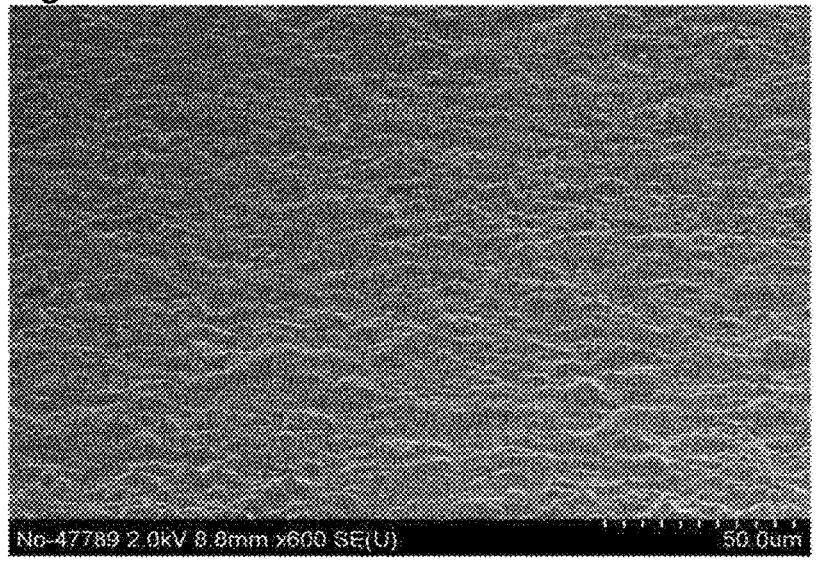
FIG. 21 is a scanning electron microscope (SEM) image of the surface of the antiglare film side of the translucent structure obtained in Ex. 17 in Examples as observed from an obliquely upward 60° direction.

A graph was prepared by plotting the density of the second convex portions (number/$\mu m^2$) on the horizontal axis and the sparkle index S on the vertical axis, based on the evaluation results in Ex. 1 to 16. The graph is shown in FIG. 13.

Further, SEM images of the outermost surface (the surface on the antiglare film side or the surface on the water/oil repellent layer side) of the translucent structures in Ex. 1, 3, 6 and 13 to 17 as observed from an obliquely upward 60° direction are shown in FIGS. 14 to 21. The SEM images were photographed by using a scanning electron microscope S-3400N manufactured by Hitach High-tech Fielding Corporation with a magnification of 600 times.

TABLE 1

| | Coating liquid | | Application conditions | | | | |
|---|---|---|---|---|---|---|---|
| | Type | Viscosity (mPa·s) | Coating liquid amount (mL/min) | Number of revolutions of cup (krpm) | Nozzle height (mm) | Cup diameter (mm) | Voltage (kV) | Number of application (time) |
| Ex. 1 | C | 1.3 | 30 | 35 | 255 | 70 | 60 | 5 |
| Ex. 2 | C | 1.3 | 30 | 35 | 255 | 70 | 60 | 6 |
| Ex. 3 | C | 1.3 | 30 | 35 | 255 | 70 | 60 | 3 |
| Ex. 4 | C | 1.3 | 25 | 35 | 255 | 70 | 60 | 3 |
| Ex. 5 | C | 1.3 | 30 | 35 | 255 | 70 | 60 | 2 |
| Ex. 6 | C | 1.3 | 25 | 35 | 255 | 70 | 60 | 2 |
| Ex. 7 | C | 1.3 | 50 | 20 | 300 | 70 | 60 | 1 |
| Ex. 8 | C | 1.3 | 50 | 15 | 300 | 70 | 60 | 1 |
| Ex. 9 | D | 2.0 | 50 | 10 | 300 | 70 | 60 | 2 |
| Ex. 10 | D | 2.0 | 75 | 11 | 300 | 70 | 60 | 1 |
| Ex. 11 | D | 2.0 | 75 | 10 | 300 | 70 | 60 | 1 |
| Ex. 12 | D | 2.0 | 75 | 12 | 300 | 70 | 60 | 1 |
| Ex. 13 | E | 1.3 | 30 | 35 | 250 | 70 | 60 | 5 |
| Ex. 14 | E | 1.3 | 30 | 35 | 250 | 70 | 60 | 6 |
| Ex. 15 | E | 1.3 | 30 | 35 | 250 | 70 | 60 | 4 |
| Ex. 16 | F | 1.3 | 25 | 35 | 250 | 70 | 60 | 6 |
| Ex. 17 | E | 1.3 | 30 | 35 | 250 | 70 | 60 | 6 |

TABLE 2

| | First convex portions | | Second convex portions | | | | | |
|---|---|---|---|---|---|---|---|---|
| | Maximum height P to V (µm) | Average diameter (µm) | Average diameter (µm) | Minimum diameter (µm) | Maximum diameter (µm) | Number in observation region (number) | Density (number/µm²) | Average height (µm) |
| Ex. 1 | 2.41 | 43.79 | 1.828 | 1.095 | 3.028 | 105 | 0.00686 | 1.933 |
| Ex. 2 | 3.04 | 46.40 | 1.674 | 1.023 | 3.708 | 88 | 0.00575 | 1.853 |
| Ex. 3 | 3.30 | 134.95 | 1.528 | 1.051 | 1.810 | 73 | 0.00477 | 1.727 |
| Ex. 4 | 2.20 | 134.97 | 1.648 | 1.563 | 1.733 | 54 | 0.00353 | 1.643 |
| Ex. 5 | 2.36 | 34.68 | 2.242 | 2.074 | 2.389 | 37 | 0.00242 | 1.679 |
| Ex. 6 | 2.37 | 26.71 | 2.459 | 1.473 | 3.445 | 25 | 0.00163 | 2.171 |
| Ex. 7 | 1.50 | 31.11 | 3.018 | 1.372 | 11.751 | 13 | 0.00085 | 1.547 |
| Ex. 8 | 1.56 | 26.92 | 2.258 | 1.161 | 3.876 | 17 | 0.00111 | 1.031 |
| Ex. 9 | 0.75 | 22.48 | 1.431 | 1.254 | 1.608 | 2 | 0.00013 | 0.615 |
| Ex. 10 | 2.65 | 18.86 | 1.770 | 1.120 | 2.420 | 2 | 0.00013 | 0.790 |
| Ex. 11 | 1.35 | 21.77 | 4.580 | 2.720 | 8.040 | 3 | 0.00020 | 2.050 |
| Ex. 12 | 1.31 | 35.33 | 2.300 | 2.050 | 2.550 | 2 | 0.00013 | 0.700 |
| Ex. 13 | 6.11 | 21.298 | 4.171 | 1.007 | 27.607 | 78 | 0.00494 | 1.483 |
| Ex. 14 | 6.67 | 45.807 | 4.974 | 1.028 | 28.479 | 78 | 0.00494 | 1.704 |
| Ex. 15 | 5.32 | 72.608 | 6.716 | 1.130 | 36.025 | 44 | 0.00278 | 1.255 |
| Ex. 16 | 1.15 | 22.415 | 1.706 | 1.030 | 4.822 | 13 | 0.000823 | 0.648 |
| Ex. 17 | 5.11 | 27.144 | 4.688 | 1.060 | 21.421 | 64 | 0.00405 | 1.559 |

| | Refractive index | Sparkle measurement | | Haze (%) | 60° C. Specular glossiness (%) |
|---|---|---|---|---|---|
| | | Sparkle index S | Evaluation | | |
| Ex. 1 | 1.45 | 57.8 | ⊚⊚ | 36.9 | 21.3 |
| Ex. 2 | 1.45 | 54.9 | ⊚⊚ | 39.0 | 20.0 |
| Ex. 3 | 1.45 | 51.8 | ⊚⊚ | 25.7 | 37.3 |
| Ex. 4 | 1.45 | 50.0 | ⊚⊚ | 22.5 | 44.6 |
| Ex. 5 | 1.45 | 46.8 | ⊚⊚ | 16.8 | 65.2 |
| Ex. 6 | 1.45 | 51.0 | ⊚⊚ | 17.1 | 62.4 |
| Ex. 7 | 1.45 | 72.3 | ⊚ | 11.0 | 88.3 |
| Ex. 8 | 1.45 | 93.7 | ○ | 10.6 | 74.7 |
| Ex. 9 | 1.45 | 117.8 | X | 11.6 | 65.8 |
| Ex. 10 | 1.45 | 147.0 | X | 29.4 | 25.3 |
| Ex. 11 | 1.45 | 154.0 | X | 8.8 | 83.8 |
| Ex. 12 | 1.45 | 156.0 | X | 11.5 | 69.8 |
| Ex. 13 | 1.45 | 35 | ⊚⊚ | 52.7 | 12.7 |
| Ex. 14 | 1.45 | 30 | ⊚⊚ | 58.3 | 12.5 |
| Ex. 15 | 1.45 | 51 | ⊚⊚ | 40.9 | 14.1 |
| Ex. 16 | 1.45 | 92 | ○ | 15.0 | 43.4 |
| Ex. 17 | 1.45 | 36 | ⊚⊚ | 52.0 | 12.8 |

As evident from the above results, the translucent structures in Ex. 1 to 8 and 13 to 17 had a haze of higher than 10% and had excellent antiglare property. Further, the sparkle index S was less than 100, and sparkle was practically sufficiently suppressed. Particularly in Ex. 1 to 6 and 13 to 15, sparkle was suppressed to a level such that the sparkle was not observed at all.

Whereas in the translucent structures in Ex. 9 to 12 in which the density of the second convex portions is less than $0.0004/\mu m^2$, remarkable sparkle was observed.

As shown in the graph in FIG. 13, within a range of the density of the second convex portions being at most $0.002/\mu m^2$, a definite negative correlation between the density of the second convex portions and the sparkle index S was confirmed.

The translucent structure of the present invention, which has a concavo-convex structure containing first convex portions and second convex portions with a number of the second convex portions of from 0.0004 to 1.2 per 1 $\mu m^2$ on its surface, is excellent in the antiglare property, and has its sparkle sufficiently suppressed.

Accordingly, for example, by disposing the translucent structure of the present invention on the display surface of an image display device, outside light is diffusely reflected by the concavo-convex structure on its surface, the reflected image will blur, and a decrease of the visibility of an image by reflection of outside light in the display surface can be suppressed. Further, sparkle is less likely to occur on the surface of the concavo-convex structure, and a decrease in the visibility of an image by sparkle can be suppressed.

INDUSTRIAL APPLICABILITY

The translucent structure of the present invention is useful for the various applications as mentioned above. Particularly, it is suitably used for an interior member of a transport vehicle, particularly for an on-vehicle article, since it can satisfy both high antiglare property and low sparkle at high levels.

REFERENCE SYMBOLS

1: Translucent structure, 2: translucent structure, 3: translucent substrate, 4: translucent substrate, 5: antiglare film, 6: translucent structure, 7: water/oil repellent layer, 5a, 4a, 7a: first convex portion, 5b, 4b, 7b: second convex portion, 10: electrostatic coating apparatus, 11: coating booth, 12: chain conveyor, 13: high voltage cable, 14: coating composition supply line, 15: coating composition recovery line, 16: air supply line, 17: electrostatic coating gun, 18: high voltage generating apparatus, 19: exhaust duct, 20: exhaust box, 21: electrically conductive substrate, 30: gun main body, 31: coating material supply tube, 32: rotating shaft, 33: outlet, 35: air supply path, 40: rotary atomizing head, 41: first member, 42: second member, 43: shaft attaching portion, 44: holding portion, 45: peripheral wall, 46: guide plane, 47: expanding portion, 48: diffusing surface, 49: front wall, 50 emission holes, 51: tubular portion, 52: back wall, 53: through-hole, S: storage room.

What is claimed is:

1. A translucent structure which has a haze of higher than 10% and at most 70%, having a concavo-convex structure on a surface thereof, wherein:
    the concavo-convex structure has: first convex portions having a diameter of larger than 10 μm in a cross section at a height of 0.05 μm+the bearing height of a surface shape obtained by measuring a region of (101 μm×135 μm) to (111 μm×148 μm) by a laser microscope, and second convex portions having a diameter of larger than 1 μm in a cross section at a height of 0.5 μm+the bearing height of the surface shape;
    the average of diameters of the first convex portions being larger than 10 μm and at most 185 μm in a cross section at a height of 0.05 μm+the bearing height of the surface shape;
    the maximum height of the first convex portions is from 0.2 to 8 μm based on a height measured from the lowest portion in the region; and
    the number density of the second convex portions is from 0.0004 to 1.2 per 1 $\mu m^2$, and the average height of the second convex portions is from 0.1 to 8 μm based on the bearing height,
    wherein the diameter of the first convex portion in a cross section is a diameter of an exact circle which has the same area as the first convex portion in the cross section, and the diameter of the second convex portion in a cross section is a diameter of an exact circle which has the same area as the second convex portion in the cross section.

2. The translucent structure according to claim 1, wherein the translucent structure comprises a translucent substrate having the concavo-convex structure on a surface thereof.

3. The translucent structure according to claim 2, wherein the translucent substrate is a glass plate.

4. The translucent structure according to claim 2, wherein the translucent substrate has a curved surface.

5. The translucent structure according to claim 1, wherein the translucent structure comprises a translucent substrate and an antiglare film formed on the translucent substrate, wherein the antiglare film has the concavo-convex structure on a surface thereof.

6. The translucent structure according to claim 5, wherein the antiglare film has a refractive index of from 1.40 to 1.46.

7. The translucent structure according to claim 5, wherein the antiglare film comprises silica as the main component.

8. The translucent structure according to claim 5, wherein a 60° specular glossiness on the surface of the antiglare film is at most 90%.

9. The translucent structure according to claim 5, wherein a 60° specular glossiness on the surface of the antiglare film is at most 50%.

10. The translucent structure according to claim 1, comprising a water/oil repellent layer, wherein a surface of the water/oil repellent layer constitutes the surface having the concavo-convex structure.

11. The translucent structure according to claim 1, wherein the translucent structure is suitable for an interior article for a transport vehicle.

12. The translucent structure according to claim 11, wherein the translucent structure is suitable for an on-vehicle article.

13. A translucent structure which has a haze of higher than 10% and at most 70%, comprising a translucent substrate and an antiglare film formed on the translucent substrate, wherein the antiglare film has a concavo-convex structure which has first convex portions having a diameter of larger than 10 μm in a cross section at a height of 0.05 μm+the bearing height of a surface shape obtained by measuring a region of (101 μm×135 μm) to (111 μm×148 μm) by a laser microscope, and second convex portions having a diameter of larger than 1 μm in a cross section at a height of 0.5 μm+ the bearing height of the surface shape;

wherein the average of diameters of the first convex portions is larger than 10 µm and at most 143 µm in a cross section at a height of 0.05 µm+the bearing height of the surface shape;

wherein the maximum height of the first convex portions is from 0.2 to 5 µm based on a height measured from the lowest portion in the region; and wherein the number density of the second convex portions is from 0.0004 to 1.2 per 1 µm$^2$, and the average height of the second convex portions is from 1 to 8 µm based on the bearing height, wherein the diameter of the first convex portion in a cross section is a diameter of an exact circle which has the same area as the first convex portion in the cross section, and the diameter of the second convex portion in a cross section is a diameter of an exact circle which has the same area as the second convex portion in the cross section.

14. The translucent structure according to claim 13, wherein the antiglare film has a refractive index of from 1.40 to 1.46.

15. The translucent structure according to claim 13, wherein the antiglare film comprises silica as the main component.

16. The translucent structure according to claim 13, wherein the translucent substrate is a glass plate.

17. The translucent structure according to claim 13, wherein the translucent substrate has a curved surface.

18. The translucent structure according to claim 13, further comprising a water/oil repellent layer, wherein a surface of the water/oil repellent layer constitutes the surface having the concavo-convex structure.

19. The translucent structure according to claim 13, wherein the translucent structure is suitable for an interior article for a transport vehicle.

20. The translucent structure according to claim 19, wherein the translucent structure is suitable for an on-vehicle article.

* * * * *